US012792971B1

(12) United States Patent
Mogill

(10) Patent No.: US 12,792,971 B1
(45) Date of Patent: Nov. 10, 2026

(54) SYSTEMS AND METHODS FOR ADAPTIVE COORDINATION OF RECURRING STATE PROCESS PROGRESSIONS FOR A REPRESENTED ENTITY

(71) Applicant: Crisp, Inc., Atlanta, GA (US)

(72) Inventor: Michael Mogill, Atlanta, GA (US)

(73) Assignee: Crisp, Inc., Atlanta, GA (US)

( * ) Notice: Subject to any disclaimer, the term of this patent is extended or adjusted under 35 U.S.C. 154(b) by 0 days.

(21) Appl. No.: 19/417,767

(22) Filed: Dec. 12, 2025

(51) Int. Cl.

| | |
|---|---|
| ***G06N 20/00*** | (2019.01) |
| ***G06F 16/901*** | (2019.01) |
| ***G06N 3/09*** | (2023.01) |
| ***G06N 3/092*** | (2023.01) |
| ***G06N 3/096*** | (2023.01) |

(52) U.S. Cl.
CPC ......... *G06N 20/00* (2019.01); *G06F 16/9024* (2019.01); *G06N 3/092* (2023.01); *G06N 3/09* (2023.01); *G06N 3/096* (2023.01)

(58) Field of Classification Search
CPC ........ G06N 20/00; G06N 20/10; G06N 20/20; G06N 3/09; G06N 3/092; G06N 3/096; G06F 16/9024
See application file for complete search history.

(56) References Cited

U.S. PATENT DOCUMENTS

| | | | | |
|---|---|---|---|---|
| 2009/0171881 | A1 | 7/2009 | Gilliam et al. | |
| 2014/0067446 | A1 | 3/2014 | Doganata et al. | |
| 2023/0358640 | A1* | 11/2023 | Liu | G06N 20/00 |
| 2024/0378450 | A1* | 11/2024 | Nimara | H01J 23/20 |
| 2025/0148774 | A1* | 5/2025 | Patraucean | G06N 3/045 |

FOREIGN PATENT DOCUMENTS

| | | | |
|---|---|---|---|
| IN | 202521064752 | A | 7/2025 |
| IN | 202541079863 | A | 9/2025 |

* cited by examiner

*Primary Examiner* — Shane D Woolwine
(74) *Attorney, Agent, or Firm* — CALDWELL LLC

(57) ABSTRACT

A system configured to receive entity input data, generate a set of phase objects, wherein the set of phase objects represent a recurring sequence of process phases, assign the entity input data to one or more fields of the set of phase objects as a function of one or more attributes of the entity input data, record the set of phase objects in a state sequence database, refine, using a reinforcement learning model, policy parameters of the represented entity as a function of the recurring state process progression, compute, using a transition evaluation model, a readiness value as a function of the entity input data and the recurring state process progression; and output an entity-specific set of phase objects and the readiness value for use in execution of a subsequent state process progression of the represented entity.

20 Claims, 7 Drawing Sheets

SYSTEMS AND METHODS FOR ADAPTIVE COORDINATION OF RECURRING STATE PROCESS PROGRESSIONS FOR A REPRESENTED ENTITY

FIELD OF THE INVENTION

The present invention generally relates to the field of adaptive workflow management. In particular, the present invention is directed to systems and methods for adaptive coordination or recurring state process progressions for a represented entity.

BACKGROUND

Organizations and computational systems often rely on recurring processes that are executed in defined phases. These processes may involve multiple data inputs, variable phase durations, and evolving conditions that impact how each phase unfolds over time. Conventional systems typically treat such recurring processes as static or rigidly defined, limiting their ability to adapt to changing entity characteristics or operational contexts. As a result, the processes may advance too early, lag unnecessarily, or fail to capture the progression signals that indicate when transitions between phases are appropriate. This lack of adaptability creates inefficiencies, reduces predictive accuracy, and impairs the ability of systems to align recurring processes with the specific needs of a given entity.

SUMMARY OF THE DISCLOSURE

In some aspects, the techniques described herein relate to a system for adaptive coordination of recurring state process progressions for a represented entity, the system including: at least a processor and a memory communicatively connected to the at least a processor, wherein the memory contains instructions configuring the at least a processor to: receive entity input data associated with a represented entity, generate a set of phase objects, wherein the set of phase objects represent a recurring sequence of process phases associated with the represented entity, assign the entity input data to one or more fields of the set of phase objects as a function of one or more attributes of the entity input data, record the set of phase objects in a state sequence database, wherein storing the set of phase objects in the state sequence database includes: storing each phase object of the set of phase objects as a function of a phase identifier and chaining the phase objects in sequence to define a recurring state process progression, refine, using a reinforcement learning model, policy parameters of the represented entity as a function of the recurring state process progression, compute, using a transition evaluation model, a readiness value as a function of the entity input data and the recurring state process progression; and output an entity-specific set of phase objects and the readiness value for use in execution of a subsequent state process progression of the represented entity.

In some aspects, the techniques described herein relate to a method for adaptive coordination of recurring state process progressions for a represented entity, the method including: receiving, by at least a processor, entity input data associated with a represented entity, generating, using the at least a processor, a set of phase objects, wherein the set of phase objects represent a recurring sequence of process phases associated with the represented entity, assigning, using the at least a processor, the entity input data to one or more fields of the set of phase objects as a function of one or more attributes of the entity input data, recording, using the at least a processor, the set of phase objects in a state sequence database, wherein storing the set of phase objects in the state sequence database includes: storing each phase object of the set of phase objects as a function of a phase identifier and chaining the phase objects in sequence to define a recurring state process progression, refining, using a reinforcement learning model, policy parameters of the represented entity as a function of the recurring state process progression, computing, using a transition evaluation model, a readiness value as a function of the entity input data and the recurring state process progression, and outputting, using the at least a processor, an entity-specific set of phase objects and the readiness value for use in execution of a subsequent state process progression of the represented entity.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for adaptive coordination of recurring state process progressions for a represented entity. In an embodiment, the systems and methods utilize a processor and memory to structure phase objects, store the phase objects in a state sequence database, and adapt policy parameters across successive process progressions using reinforcement learning.

Aspects of the present disclosure can be used to improve computational modeling of process phase transitions. Aspects of the present disclosure can also be used to increase predictive accuracy when determining readiness to progress between phases of a recurring process progression. This is so, at least in part, because entity input data is captured, encoded into structured phase objects, and evaluated with transition models that are trained on historical process data.

Aspects of the present disclosure allow for an adaptive loop in which process phase objects are refined, readiness values are recalculated, and updated parameters are applied to subsequent process progressions of the represented entity. Exemplary embodiments illustrating aspects of the present disclosure are described below in the context of several specific examples.

Figure 1:
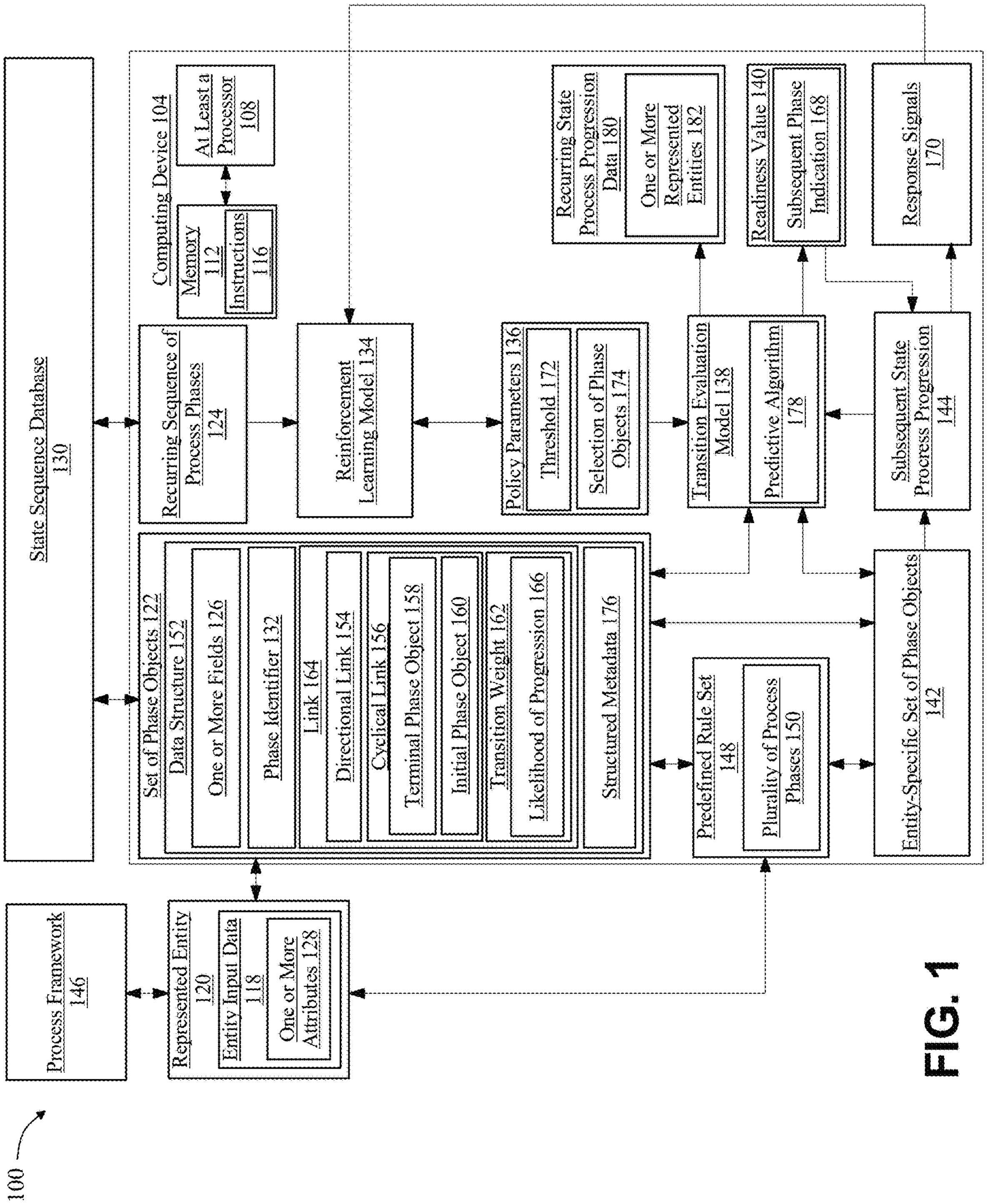
FIG. 1 is a block diagram of an exemplary system for adaptive coordination or recurring state process progressions for a represented entity.

Referring now to FIG. 1, an exemplary embodiment of system 100 for adaptive coordination of recurring state process progressions for a represented entity is illustrated. System 100 may include circuitry such as, without limitation at least a processor 108 communicatively connected to a memory 112 containing instructions 116 configuring at least a processor 108 to initiate one or more tasks as described throughout this disclosure; for instance, circuitry may include and/or be included in a computing device. As used in this disclosure, "communicatively connected" means connected by way of a connection, attachment, or linkage between two or more relata such as without limitation electronic components, modules, and/or devices which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals there between may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

Circuitry may alternatively or additionally be implemented by configuring a hardware device such as a combinatorial or sequential logic circuit, an application-specific integrated circuit (ASIC), a field-programmable gate array (FPGA), or other hardware unit; memory may be attached thereto to further configure the hardware unit using read-only memory (ROM) or any other static or writable memory as described in this disclosure. Alternatively or additionally, hardware units and/or modules may be combined with and/or in communication with a processor, such as without limitation in a system-on-chip architecture wherein some functions are configured by modification or design of hardware circuitry, such as without limitation FPGA circuitry, while others are configured in the form of instructions in memory for one or more processors. As a non-limiting example, any step or combination of steps described herein may be performed entirely using hardware circuit configured to perform such steps either with static memory or rewritable memory. Such steps or combinations of steps may include signing with a digital signature, cryptographically hashing, evaluation of zero-knowledge proofs, or any other specific process described in this disclosure.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

In continued reference to FIG. 1, in an embodiment, at least a processor 108 may be configured to receive entity input data 118 associated with a represented entity 120. For purposes of this disclosure, "entity input data" refers to information that characterizes the state, attributes, or activities of a represented entity 120 at a particular point in time. Non-limiting examples of entity input data 118 may include: (i) numerical metrics such as task duration, error rates, and/or throughput; (ii) categorical descriptors such as role identifiers, workflow phase labels, and/or status indicators; and/or (iii) multimodal inputs such as text descriptions, time-series sensor readings, and/or interaction logs. In an embodiment, entity input data 118 may be the raw material ingested by at least a processor 108 and may be directly associated with a represented entity 120, ensuring that all downstream models, including phase object generation and readiness value 140 computation, remain personalized and context-aware. Alternatively, in some cases, entity input data 118 may include processed data, such as outputs from one or more data processing pipelines that may generate scores or metrics associated with the entity and their position within a process. Within system 100, entity input data 118 may serve as the first critical layer of initialization.

In further reference to FIG. 1, for purposes of this disclosure, a "represented entity" is any individual, organization, machine, or process whose recurring state process progression is being modeled by the system. Non-limiting examples may include: (i) a human employee within an enterprise workflow; (ii) a machine component undergoing routine maintenance phases; (iii) a software service instance progressing through deployment cycles, and/or (iv) an organization that includes one or more employees. In an embodiment, each represented entity 120 may thus be bound to its unique stream of entity input data 118. Entity input data 118 may exist as an informational reflection of the represented entity 120, and the represented entity 120 may be the referent context that gives meaning to the entity input data 118. In the broader system, represented entities may be the anchors for adaptive process coordination, their individual data streams may allow system 100 to compute readiness values 140 that are entity-specific rather than generic.

Still referring to FIG. 1, in an embodiment, at least a processor 108 may be configured to receive entity input data 118 through one or more automated processes and/or manual interactions. In an embodiment, automated reception of entity input data 118 may include, without limitation, establishing communication channels with external systems, such as application programming interfaces (APIs), enterprise resource planning (ERP) systems, or practice management software, wherein at least a processor 108 may periodically poll, subscribe to, or passively listen for data streams that include metrics or descriptors relevant to the represented entity 120. For example, during an audit phase, at least a processor 108 may automatically retrieve matter-completion statistics or billing utilization data from a firm's management system, or during an implementation phase, pull usage logs from collaboration or knowledge-sharing platforms to assess adoption rates. In addition, or alternatively, at least a processor 108 may receive entity input data 118 through manual entry at a user interface, wherein a law firm leader, team manager, or participant may input information such as progress updates, categorical selections, qualitative feedback, and/or narrative annotations on cultural adaptation. In such cases, at least a processor 108 may capture keystrokes, form selections, survey responses, and/or uploaded documents, and may encode the received input into structured fields for subsequent assignment to phase objects. Whether received through automated pipelines or user-driven inputs, at least a processor 108 may normalize the collected information into a compatible format, optionally validate the data against predefined schemas or thresholds, and store the resulting values in memory for use in initializing and advancing recurring coaching phases of system 100.

In continued reference to FIG. 1, in some embodiments, normalization of entity input data 118 may include transforming heterogeneous inputs into standardized formats so that values originating from different sources can be consistently compared and aggregated. For example, financial figures uploaded by a firm administrator may be converted into a unified currency and time scale, while survey responses from attorneys may be mapped to a standardized Likert scale to facilitate cross-phase evaluation. In an embodiment, validation of entity input data 118 may further include applying schema-based checks, threshold comparisons, and/or rule-based filters to ensure completeness and accuracy. As a non-limiting example, at least a processor 108 may verify that billing utilization percentages fall within plausible ranges during the audit phase, or that required adoption survey fields have been completed before the implementation phase is marked as valid. Once normalized and validated, at least a processor 108 may store the resulting values in memory and record them within the structured workflow database of system 100. In an embodiment, storage may include indexing data by phase identifiers 132 (diagnosis, audit, implementation, execution), tagging with metadata such as timestamps or user roles, and linking to the corresponding represented entity 120. By maintaining data in a structured, validated, and retrievable form, system 100 may enable reinforcement learning models 134 to operate on clean inputs and ensure predictive evaluations of readiness are grounded in reliable evidence.

With continued reference to FIG. 1, in an embodiment, the entity input data 118 may be generated, using at least a processor 108 and as a function of an interaction between the represented entity 120 and a process framework 146. For purposes of this disclosure, an "interaction" may refer to any exchange of information, activity, or signal that occurs between the represented entity 120 and one or more components of system 100. Non-limiting examples of interactions may include a law firm client uploading financial performance data during a diagnosis phase, a team responding to an adoption survey during an audit phase, and/or a partner recording qualitative notes on leadership alignment during an implementation phase. In an embodiment, each interaction may be explicit, such as a user submitting progress updates through a dashboard, and/or implicit, such as automated capture of login frequencies, task completions, or other digital traces of workflow activity. For purposes of this disclosure, a "process framework" may refer to the structured, recurring set of phases encoded by the system to guide progression of the represented entity 120. In some embodiments, the process framework 146 may include a closed-loop coaching cycle including diagnosis, audit, implementation, and execution phases. Each phase may, in some cases, define the types of interactions to be captured, the metrics or qualitative feedback to be emphasized, and/or the schemas used for storing and analyzing the resulting entity input data 118. For instance, during the diagnosis phase, the process framework 146 may emphasize metadata on firm structure and baseline performance outcomes, while in the implementation phase it may emphasize adoption rates of recommended tools or practices. The process framework 146 therefore may provide both the structure and the context within which interactions are translated into entity input data 118.

With further reference to FIG. 1, in an embodiment, at least a processor 108 may monitor for interactions defined by the process framework 146, capture raw information from those interactions, encode the information into structured fields aligned with the appropriate phase object, and record the resulting values for downstream reinforcement learning and readiness evaluation. In an embodiment, monitoring may optionally include standing subscriptions to external systems (e.g., billing software or survey platforms) or periodic polling of firm-level performance dashboards. In some cases, monitoring may also include passively logging user activity within a coaching interface, such as navigation clicks or time spent in training modules. Once an interaction is observed, at least a processor 108 may capture raw information in its native form, which may range from numerical values such as billing utilization percentages, to categorical survey responses, to unstructured text commentary. In some embodiments, capture may involve preprocessing steps such as timestamping the interaction, associating it with a represented entity 120 identifier, or filtering out incomplete entries. In an embodiment, encoding may then map the captured values into structured fields, such as a "diagnosis-phase performance outcome" field, an "audit-phase cultural adaptation score," or an "implementation adoption metric," optionally including derived fields created by natural language processing or statistical transformation. In certain scenarios, encoding may also involve routing text to an NLP module for topic classification or aligning a numeric KPI with a standardized scale so it can be compared across multiple firms. In an embodiment, recording may include writing the encoded fields into a state sequence database 130, where each record is indexed to a phase object and chained to prior and subsequent records in the coaching cycle; optionally, invalid or incomplete records may be redirected into a staging area for remediation before being stored in the primary database. By grounding the generation of entity input data 118 in both interactions and the governing process framework 146, system 100 may ensure that the data reflects not only the activities of the represented entity 120 but also the phase-specific goals and conditions of the adaptive coaching cycle.

In continued reference to FIG. 1, in an embodiment, entity input data 118 may be preprocessed by a language processing module, which may analyze textual or mixed-format inputs to extract semantic features, classify responses, and/or generate structured representations prior to assignment into phase objects. For example, narrative feedback provided by a law firm partner during the diagnosis phase may be parsed into topic categories such as "financial performance," "cultural alignment," or "client service gaps." Similarly, open-ended survey responses collected during the audit phase may be converted into sentiment scores or mapped to standardized adoption indicators, allowing them to be compared across different firms or process cycles. In some cases, the language processing module may generate embeddings or vectorized representations of free-text inputs, which may then be stored as structured metadata linked to the represented entity 120. These preprocessing steps may optionally operate in parallel with numeric or categorical normalization pipelines, thereby enriching the entity input data 118 with higher-order features that reinforce downstream reinforcement learning and readiness evaluation. By incorporating a language processing module, system 100 may expand its capacity to interpret complex human-generated data, ensuring that qualitative feedback is encoded alongside quantitative metrics within the adaptive coaching framework.

Still referring to FIG. 1, in an embodiment, language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

Still referring to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

Still referring to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Gradient Descent (SGD), and parameter grid-searching classification techniques; the result may include a classification algorithm that returns ranked associations.

Alternatively, or additionally, and with continued reference to FIG. 1, language processing module may be produced using one or more large language models (LLM). A "large language model," as used herein, is a deep learning data structure that can recognize, summarize, translate, predict and/or generate text and other content based on knowledge gained from massive datasets. Large language models may be trained on large sets of data. In some embodiments, an LLM may be trained or fine-tuned on datasets that include domain-specific information relevant to law firm operations and coaching outcomes. Training sets may be drawn from diverse sources, such as non-limiting examples: anonymized client feedback reports, cultural assessment surveys, adoption audits, performance review notes, knowledge management documents, case summaries, and communications from firm management systems. In certain embodiments, training sets may also incorporate structured metadata generated during prior process cycles, such as progression logs or readiness evaluation outcomes, thereby enabling the LLM to align free-text analysis with phase-specific benchmarks. As a non-limiting example, a training set may include historical implementation-phase survey responses paired with observed adoption rates, allowing the model to learn correlations between qualitative statements and measurable performance outcomes. In an embodiment, an LLM may include one or more architectures based on capability requirements of an LLM. Exemplary architectures may include, without limitation, GPT (Generative Pretrained Transformer), BERT (Bidirectional Encoder Representations from Transformers), T5 (Text-To-Text Transfer Transformer), and the like. Architecture choice may depend on a needed capability such generative, contextual, or other specific capabilities.

With continued reference to FIG. 1, in some embodiments, an LLM may be generally trained. As used in this disclosure, a "generally trained" LLM is an LLM that is trained on a general training set comprising a variety of subject matters, data sets, and fields. In some embodiments, an LLM may be initially generally trained. Additionally, or alternatively, an LLM may be specifically trained. As used in this disclosure, a "specifically trained" LLM is an LLM that is trained on a specific training set, wherein the specific training set includes data including specific correlations for the LLM to learn. As a non-limiting example, an LLM may be generally trained on a general training set, then specifically trained on a specific training set. In an embodiment, specific training of an LLM may be performed using a supervised machine learning process. In some embodiments, generally training an LLM may be performed using an unsupervised machine learning process. As a non-limiting example, specific training set may include information from a database. As a non-limiting example, specific training set may include text related to the users such as user specific data for electronic records correlated to examples of outputs. In an embodiment, training one or more machine learning models may include setting the parameters of the one or more models (weights and biases) either randomly or using a pretrained model. Generally training one or more machine learning models on a large corpus of text data can provide a starting point for fine-tuning on a specific task. A model such as an LLM may learn by adjusting its parameters during the training process to minimize a defined loss function, which measures the difference between predicted outputs and ground truth. Once a model has been generally trained, the model may then be specifically trained to fine-tune the pretrained model on task-specific data to adapt it to the target task. Fine-tuning may involve training a model with task-specific training data, adjusting the model's weights to optimize performance for the particular task. In some cases, this may include optimizing the model's performance by fine-tuning hyperparameters such as learning rate, batch size, and regularization. Hyperparameter tuning may help in achieving the best performance and convergence during training. In an embodiment, fine-tuning a pretrained model such as an LLM may include fine-tuning the pretrained model using Low-Rank Adaptation (LoRA). As used in this disclosure, "Low-Rank Adaptation" is a training technique for large language models that modifies a subset of parameters in the model. Low-Rank Adaptation may be configured to make the training process more computationally efficient by avoiding a need to train an entire model from scratch. In an exemplary embodiment, a subset of parameters that are updated may include parameters that are associated with a specific task or domain.

With continued reference to FIG. 1, in some embodiments an LLM may include and/or be produced using Generative Pretrained Transformer (GPT), GPT-2, GPT-3, GPT-4, and the like. GPT, GPT-2, GPT-3, GPT-3.5, and GPT-4 are products of Open AI Inc., of San Francisco, CA. An LLM may include a text prediction based algorithm configured to receive an article and apply a probability distribution to the words already typed in a sentence to work out the most likely word to come next in augmented articles. For example, if a law firm leader provides a survey response beginning with the phrase "Our biggest challenge during implementation has been . . . ," the LLM may predict likely continuations such as "adoption of new billing practices," "engagement from senior partners," or "integration with case management systems," ranking outputs by likelihood or by alignment with domain-specific training data. In this manner, the LLM may convert partial or ambiguous feedback into structured candidate completions, which may then be reviewed, scored, or mapped into phase object fields. Similarly, when analyzing an audit-phase narrative that begins with "The team has shown significant progress in . . . ," the LLM may rank completions such as "collaboration," "workflow efficiency," or "knowledge sharing" to generate structured adoption indicators. In some embodiments, an LLM may include an encoder component for embedding contextual information (e.g., firm size, practice area, phase of the coaching cycle) and a decoder component for generating predictions or structured text outputs aligned with the goals of the coaching framework.

Still referring to FIG. 1, an LLM may include a transformer architecture. In some embodiments, encoder component of an LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an LLM and/or transformer architecture may include an attention mechanism. An "attention mechanism," as used herein, is a part of a neural architecture that enables a system to dynamically quantify the relevant features of the input data. In the case of natural language processing, input data may be a sequence of textual elements. It may be applied directly to the raw input or to its higher-level representation.

With continued reference to FIG. 1, attention mechanism may represent an improvement over a limitation of an encoder-decoder model. An encoder-decider model encodes an input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, an LLM may predict the next word by searching for a set of positions in a source sentence where the most relevant information is concentrated. An LLM may then predict the next word based on context vectors associated with these source positions and all the previously generated target words, such as textual data of a dictionary correlated to a prompt in a training data set. A "context vector," as used herein, are fixed-length vector representations useful for document retrieval and word sense disambiguation.

Still referring to FIG. 1, attention mechanism may include, without limitation, generalized attention self-attention, multi-head attention, additive attention, global attention, and the like. In generalized attention, when a sequence of words or an image is fed to an LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, an LLM may pick up particular parts at different positions in the input sequence and over time compute an initial composition of the output sequence. In multi-head attention, an LLM may include a transformer model of an attention mechanism. Attention mechanisms, as described above, may provide context for any position in the input sequence. For example, if the input data is a natural language sentence, the transformer does not have to process one word at a time. In multi-head attention, computations by an LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), an LLM may make use of attention alignment scores based on a number of factors. Alignment scores may be calculated at different points in a neural network, and/or at different stages represented by discrete neural networks. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, an LLM may either attend to all source words or predict the target sentence, thereby attending to a smaller subset of words.

With continued reference to FIG. 1, multi-headed attention in encoder may apply a specific attention mechanism called self-attention. Self-attention allows models such as an LLM or components thereof to associate each word in the input to other words. As a non-limiting example, when analyzing a law firm leader's survey response during the audit phase that states "The primary barrier to adoption has been lack of partner support," an LLM may learn to associate "barrier" with "adoption" and "partner support," thereby capturing that the concept of adoption is contextually dependent on leadership engagement. Similarly, in an implementation-phase narrative such as "The team has shown steady improvement in billing accuracy and workflow efficiency," the model may learn associations between "billing accuracy" and "workflow efficiency," identifying them as co-occurring signals of execution readiness. In some embodiments, to achieve self-attention, input may be fed into three distinct fully connected neural network layers to create query, key, and value vectors. A query vector may include an entity's learned representation for comparison to determine attention score. A key vector may include an entity's learned representation for determining the entity's relevance and attention weight. A value vector may include data used to generate output representations. Query, key, and value vectors may be fed through a linear layer; then, the query and key vectors may be multiplied using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

Still referencing FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

Continuing to refer to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With further reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filled with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the softmax of this matrix is taken, the negative infinities will be zeroed out; this leaves zero attention scores for "future tokens."

Still referring to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classifier will be of size 10,000. The output of this classifier may be fed into a softmax layer which may serve to produce probability scores between zero and one. The index may be taken of the highest probability score in order to determine a predicted word.

Still referring to FIG. 1, decoder may take this output and add it to the decoder inputs. Decoder may continue decoding until a token is predicted. Decoder may stop decoding once it predicts an end token.

Continuing to refer to FIG. 1, in some embodiment, decoder may be stacked N layers high, with each layer taking in inputs from the encoder and layers before it. Stacking layers may allow an LLM to learn to extract and focus on different combinations of attention from its attention heads.

With continued reference to FIG. 1, an LLM may receive an input. Input may include a string of one or more characters. Inputs may additionally include unstructured data. For example, input may include one or more words, a sentence, a paragraph, a thought, a query, and the like. A "query" for the purposes of the disclosure is a string of characters that poses a question. In some embodiments, input may be received from a user device. User device may be any computing device that is used by a user. As non-limiting examples, user device may include desktops, laptops, smartphones, tablets, and the like. In some embodiments, input may include any set of data associated with a law firm client's progression through a coaching cycle, such as qualitative feedback from a cultural adaptation survey, narrative notes on implementation challenges, or performance metrics logged during execution.

With continued reference to FIG. 1, an LLM may generate at least one annotation as an output. At least one annotation may be any annotation as described herein. In some embodiments, an LLM may include multiple sets of transformer architecture as described above. Output may include a textual output. A "textual output," for the purposes of this disclosure is an output comprising a string of one or more characters. Textual output may include, for example, a plurality of annotations for unstructured data. In some embodiments, textual output may include a phrase or sentence identifying the status of a user query. In some embodiments, textual output may include a sentence or plurality of sentences describing a response to a user query. As a non-limiting example, this may include restrictions, timing, advice, dangers, benefits, and the like.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

Still referring to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or computing device 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into computing device 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With further reference to FIG. 1, in an embodiment, at least a processor 108 may be configured to generate a set of phase objects 122. For purposes of this disclosure, a "phase object" is a data structure instantiated within the system to represent one step of the coaching cycle as applied to a represented entity 120. In an embodiment, each phase object may include, without limitation, fields for measured outcome values (e.g., revenue growth percentage, matter turnaround time), adaptation metrics (e.g., cultural adoption scores, leadership alignment indices), and system usage indicators (e.g., logins to coaching dashboards, completion rates of assigned modules). In an embodiment, the set of phase objects 122 may represent a recurring sequence of process phases 124 associated with the represented entity 120. A "process phase," for purposes of this disclosure, is a distinct portion of the recurring coaching cycle in which the represented entity 120 is guided through a particular set of goals and evaluative checkpoints. Non-limiting examples of process phases may include a diagnosis phase focused on identifying gaps, an audit phase focused on evaluating current practices, an implementation phase focused on embedding recommended changes, and/or an execution phase focused on operationalizing those changes. A "recurring sequence of process phases," for purposes of this disclosure, is the repeated progression through process phases over successive cycles. In an embodiment, each cycle of the successive cycles may generate new data that informs and recalibrates subsequent iterations. In a non-limiting embodiment, the set of phase objects 122 generated by at least a processor 108 may encode a recurring coaching sequence for a given represented entity 120, ensuring that measured outcomes, adaptation metrics, and usage indicators are consistently captured, stored, and linked to phase-specific contexts across cycles.

In further reference to FIG. 1, in an embodiment, generating the set of phase objects 122 may include accessing a predefined rule set 148, wherein the predefined rule set 148 parameterizes a plurality of process phases 150. For purposes of this disclosure, a "predefined rule set" is a collection of logical conditions, thresholds, or schema specifications established prior to system execution that guide how phase objects are created and populated. For purposes of this disclosure, "parameterizing" is the act of defining variables, field structures, or operational criteria that configure how a process phase is represented and evaluated within the system. In an embodiment, the predefined rule set 148 may include, without limitation, conditions for which outcome values are tracked in each phase, thresholds that indicate minimum acceptable performance, and/or structural definitions specifying how adaptation metrics and system usage indicators are organized. For example, the diagnosis phase may be parameterized with rules requiring collection of baseline revenue growth percentages and cultural readiness survey scores, while the implementation phase may be parameterized with rules requiring adoption rates of new billing practices and workflow completion percentages. In some embodiments, the predefined rule set 148 may also specify optional relationships between fields, such as weighting cultural adoption scores more heavily than usage indicators when computing readiness to advance from audit to implementation. By accessing the predefined rule set 148, at least a processor 108 may ensure that phase objects are instantiated with consistent variables, thresholds, and structures, enabling comparability across cycles and adaptability to reinforcement learning updates.

Still referring to FIG. 1, in some embodiments, the predefined rule set 148 may itself be generated through a combination of expert input, historical coaching data, and system configuration parameters. In an embodiment, initial rules may be established by administrators or subject matter experts who define the critical outcome values, adaptation metrics, and system usage indicators for each process phase of the coaching cycle. For example, an initial diagnosis-phase rule set may be generated to require baseline cultural surveys and revenue tracking, while an implementation-phase rule set may be generated to emphasize adoption logs and workflow compliance rates. In further embodiments, the predefined rule set 148 may be dynamically updated after completion of each cycle by an adaptation module. The adaptation module may analyze new input data captured across phases, evaluate performance against prior thresholds, and recalibrate the rules accordingly. In an embodiment, updates may include modifying threshold values (e.g., adjusting the minimum acceptable adoption percentage), changing the relative weighting of outcome metrics and adaptation scores, and/or introducing new parameters to capture emerging indicators of readiness. In this way, the predefined rule set 148 may evolve as a function of accumulated coaching data, enabling system 100 to refine its phase definitions and maintain alignment with the evolving needs of the represented entity 120 over successive cycles.

In continued reference to FIG. 1, in an embodiment, generating the set of phase objects 122 may include instantiating, for each process phase of the plurality of process phases 150, a data structure 152 corresponding to each process phase. For purposes of this disclosure, a "data structure" is an organized construct that specifies how values, fields, and relationships are stored, accessed, and manipulated in connection with a process phase. In some embodiments, each data structure 152 may include common fields for measured outcome values, adaptation metrics, and/or system usage indicators, but the internal composition of these fields may differ according to the goals of the corresponding process phase. For example, a diagnosis-phase data structure may emphasize baseline cultural adaptation scores and revenue benchmarks, while an implementation-phase data structure may emphasize adoption rates of newly introduced workflows and completion percentages of training modules. In some cases, the data structures 152 may be implemented as distinct processing pipelines, wherein each pipeline integrates with one or more plugin algorithms tailored to its phase context. As a non-limiting example, the audit-phase pipeline may incorporate a statistical anomaly-detection plugin for benchmarking firm performance against prior cycles, while the execution-phase pipeline may integrate a predictive modeling plugin to assess whether matter turnaround improvements are sustained. In this manner, instantiating a data structure 152 for each process phase not only encodes phase-specific metrics and schema definitions but also configures the computational pathway and analytic plugins that will be applied to incoming entity input data 118. This may allow system 100 to manage recurring process cycles as both a sequence of structured records and a sequence of adaptable, phase-specific analytic workflows.

For purposes of this disclosure, a "process cycle" is a recurring sequence of process phases 124 executed in relation to a represented entity 120.

With continued reference to FIG. 1, in an embodiment, generating the set of phase objects 122 may include defining one or more fields 126 within the data structure 152 to receive values derived from the entity input data 118. For purposes of this disclosure, a "field" is a designated location within a data structure 152 configured to store a unit of information according to a specified type, schema, or semantic label. For purposes of this disclosure, a "value" is a data element assigned to a field. In an embodiment, the content of the value may be derived from raw, processed, or predicted information associated with the represented entity 120. In some embodiments, fields may be defined broadly enough to accept numerical, categorical, and/or unstructured inputs, allowing flexibility across different coaching phases. For example, a diagnosis-phase field may be configured to store values corresponding to baseline revenue growth percentages, while an audit-phase field may store categorical values representing cultural adoption survey results, and an implementation-phase field may store usage log values such as dashboard activity counts. In other cases, a field may accept values that are outputs of preprocessing or predictive algorithms, such as sentiment scores generated by a language processing module or readiness indices generated by a transition evaluation model 138. Defining fields within each data structure 152 may ensure that entity input data 118 is captured in a consistent, phase-specific format, enabling at least a processor 108 to populate phase objects with both raw evidence and derived indicators. This structured representation may allow reinforcement learning and readiness evaluation modules to access values that are normalized, comparable, and aligned with the goals of each process phase, thereby supporting adaptive progression through the recurring coaching cycle.

In further reference to FIG. 1, in some embodiments, the data structures 152 corresponding to phase objects may be implemented using a variety of formats, each selected based on the type of entity input data 118 and the analytic operations required. In an embodiment, relational table structures may be employed where fields map to columns and values map to rows, enabling consistent storage of structured metrics such as revenue growth percentages or adoption survey scores. Further, in some cases, key-value stores may be utilized in cases where sparse or flexible data must be accommodated, for example when certain firms provide narrative-only feedback while others provide detailed numerical indicators. In an embodiment, hierarchical document formats such as JSON or XML may be used to represent nested coaching information, such as top-level execution outcomes with subordinate cultural adaptation scores and system usage indicators. In some cases, graph data structures may be employed to represent the recurring sequence of process phases 124, wherein nodes correspond to phase objects, edges correspond to transitions between phases, and attributes stored on nodes capture field values. In some implementations, columnar data stores may be advantageous for accelerating analytic queries, particularly where reinforcement learning or readiness models require rapid aggregation of a specific metric across many represented entities. In still other embodiments, object-oriented data structures may be instantiated as class instances, where each phase object is an object containing fields as attributes and associated methods for executing validation, normalization, or plugin algorithms. By permitting phase objects to be realized across these different structural representations, system 100 may flexibly adapt to diverse data types, performance requirements, and analytic contexts within the closed-loop coaching cycle.

Still referring to FIG. 1, in an embodiment, at least a processor 108 may be configured to assign the entity input data 118 to one or more fields 126 of the set of phase objects 122 as a function of one or more attributes 128 of the entity input data 118. For purposes of this disclosure, an "attribute" is a characteristic, property, or descriptor associated with a unit of entity input data 118 that can be used to determine how that data should be classified, stored, or processed within the system. In an embodiment, one or more attributes 128 may include, without limitation, data type (e.g., numeric, categorical, textual), source system (e.g., billing platform, survey tool, dashboard interface), temporal marker (e.g., timestamp, cycle identifier), and/or semantic context (e.g., whether the data relates to cultural adaptation, measured outcomes, or system usage). In an embodiment, at least a processor 108 may evaluate the one or more attributes 128 to route data into the correct fields of the corresponding phase object. For example, a numeric attribute flagged as a financial performance metric may be directed into a diagnosis-phase outcome field, while a categorical attribute marked as a cultural adoption survey result may be stored in an audit-phase adaptation field. In other cases, a textual attribute identified as narrative feedback may be processed by a language module to generate a derived sentiment value, which may then be assigned to an implementation-phase adaptation field. By leveraging attributes as routing logic, system 100 may ensure that incoming entity input data 118 is consistently and accurately mapped into phase objects, thereby preserving alignment between the raw or processed data and the intended goals of each process phase.

With further reference to FIG. 1, in some embodiments, attribute-based assignment may include additional logic for handling cases where attributes are missing, ambiguous, or require inference. For instance, if entity input data 118 is received without an explicit source system attribute, at least a processor 108 may attempt to infer the source by analyzing metadata such as file structure, API headers, and/or submission context. If a temporal attribute is incomplete or inconsistent, system 100 may assign a default timestamp (e.g., cycle start date) or align the data with the closest valid time marker based on historical patterns. In cases where semantic attributes are ambiguous, such as free-text feedback that could relate to both cultural adaptation and workflow efficiency, at least a processor 108 may invoke a language processing module to disambiguate the context and generate a probability-weighted assignment to one or more candidate fields. In some embodiments, unresolved attribute conflicts may trigger a staging pathway in which the entity input data 118 is temporarily quarantined for manual review or further automated validation before being committed to a phase object. In yet other cases, at least a processor 108 may assign provisional values to placeholder fields, marking them with an attribute confidence score that signals downstream models to adjust their weighting accordingly. These optional side paths may ensure that even imperfect or incomplete input data can be incorporated into the coaching cycle, while maintaining transparency and adaptability in the assignment of values to phase object fields.

With continued reference to FIG. 1, in an embodiment, at least a processor 108 may be configured to record the set of phase objects 122 in a state sequence database 130. For purposes of this disclosure, a "state sequence database" is a persistent data store configured to maintain ordered representations of phase objects. In an embodiment, the state sequence database 130 may maintain the set of phase objects 122 including their fields, relationships, and identifiers, so that the recurring coaching cycle of a represented entity 120 can be reconstructed, queried, and analyzed over time. In some embodiments, the state sequence database 130 may operate as a hybrid store, supporting both relational tables for structured phase fields and graph-based records for linking phase objects in sequence. In an embodiment, recording phase objects in this manner may ensure that the measured outcome values, adaptation metrics, and system usage indicators are not only captured at the level of an individual phase, but also preserved within the broader context of the recurring sequence of process phases 124. By storing the set of phase objects 122 in the state sequence database 130, system 100 may enable reinforcement learning modules and predictive readiness models to access a longitudinal view of each entity's progression, thereby supporting adaptive recalibration and individualized pacing across successive cycles.

In continued reference to FIG. 1, in an embodiment, the state sequence database 130 may be deployed in a variety of configurations depending on system requirements, security considerations, and scalability needs. In certain implementations, the state sequence database 130 may be local to computing device or server associated with a single represented entity 120, allowing data to be stored and accessed in a self-contained environment. In other embodiments, the state sequence database 130 may be implemented as a global repository within a distributed cloud network, enabling multiple represented entities to be recorded in parallel while maintaining separation through tenant-specific namespaces or access controls. In an embodiment, hybrid deployments may be implemented, wherein sensitive phase object data is stored locally, while aggregate or anonymized transition data is synchronized to a cloud-hosted global database for reinforcement learning and benchmarking across firms. In this way, system 100 may flexibly support different operational models, ranging from stand-alone firm-specific deployments to collaborative, cloud-networked platforms that facilitate cross-entity adaptation and predictive model refinement.

In further reference to FIG. 1, in an embodiment, recording the set of phase objects 122 in a state sequence database 130 may include storing each phase object of the set of phase objects 122 as a function of a phase identifier 132. For purposes of this disclosure, a "phase identifier" is a unique label or index assigned to a phase object that distinguishes it within the recurring sequence of process phases 124 for a represented entity 120. In some embodiments, a phase identifier 132 may be numeric (e.g., 1, 2, 3, 4), symbolic (e.g., DIAG for diagnosis, AUD for audit, IMP for implementation, EXE for execution), or composite (e.g., pairing a phase label with a cycle number such as DIAG-Cycle3). By associating each stored phase object with its phase identifier 132, at least a processor 108 may ensure that measured outcome values, adaptation metrics, and system usage indicators are correctly bound to the intended stage of the coaching cycle. For example, a diagnosis-phase identifier 132 may allow retrieval of baseline cultural adaptation scores for a firm, while an execution-phase identifier 132 may allow aggregation of system usage indicators that reflect long-term adoption. In further embodiments, phase identifiers 132 may also support temporal ordering, enabling the state sequence database 130 to reconstruct how an entity's progression unfolded over multiple cycles. This structure may additionally allow reinforcement learning and predictive models to access phase-specific data with clarity, ensuring that updates to thresholds or readiness evaluations are contextualized to the correct phase of the adaptive coaching sequence.

With further reference to FIG. 1, in some embodiments, the state sequence database 130 may additionally maintain explicit representations of relationships between indexed phase objects. These relationships may be stored as metadata entries, foreign key references, and/or graph edges that define how one phase object connects to another within or across cycles. For example, a diagnosis-phase object indexed by its identifier may include a relationship pointer to the subsequent audit-phase object, establishing continuity between the two stages. Relationships may also capture cross-cycle linkages, such as associating an execution-phase object from one cycle with the diagnosis-phase object of the next cycle, thereby encoding the cyclical nature of the coaching framework. In certain embodiments, relationship records may include attributes such as timestamps, transition conditions, or confidence scores that qualify the strength or reliability of the linkage. Storing relationships alongside phase identifiers 132 allows system 100 not only to retrieve individual phase objects, but also to reconstruct the entire progression path of a represented entity 120, facilitating downstream analysis, reinforcement learning updates, and readiness evaluations that rely on the ordered dependencies between phases.

Still referring to FIG. 1, in an embodiment, recording the set of phase objects 122 in a state sequence database 130 may include chaining the phase objects in sequence to define a recurring state process progression. For purposes of this disclosure, "chaining" is the act of creating explicit connections or links between phase objects such that the relationship and order among them can be computationally represented and traversed. For purposes of this disclosure, a "sequence" is an ordered arrangement of phase objects that reflects the progression of a represented entity 120 through defined process phases. For purposes of this disclosure, a "recurring state process progression" is the repeated traversal of a sequence of process phases across successive cycles. In an embodiment, data from one cycle may inform and influence subsequent iterations. In some embodiments, chaining may be implemented by storing directional pointers between phase objects, by encoding graph edges that connect identifiers, and/or by maintaining ordered indices that preserve temporal order. For example, a diagnosis-phase object may be chained to an audit-phase object, followed by an implementation-phase object, and then an execution-phase object, thereby forming one complete sequence. When repeated, this chaining produces a recurring state process progression that reflects a closed-loop coaching cycle. By maintaining explicit chains, the state sequence database 130 may allow system 100 to reconstruct historical progressions, evaluate readiness to advance, and refine policy parameters 136 based on the longitudinal relationships among phases.

With further reference to FIG. 1, in an embodiment, chaining the phase objects in sequence may include defining a directional link 154 from each phase object to a subsequent phase object. For purposes of this disclosure, a "directional link" is a defined connection between two phase objects. In an embodiment, the directional link 154 may encode the orientation of progression from one phase object toward another. For purposes of this disclosure, a "subsequent phase object" is any phase object that follows another within the recurring state process progression. For example, this may include a forward, backward, or reiterative direction. In some embodiments, directional links may represent forward progress through the coaching cycle (e.g., diagnosis→audit→implementation→execution), backward regression if readiness thresholds are not met (e.g., implementation→audit), or reiteration when a represented entity 120 repeats a phase for refinement (e.g., audit→audit across cycles). In an embodiment, directional links may optionally be created and maintained by a linking module, which may be configured to analyze entity input data 118, historical outcomes, and policy parameters 136 to determine the most appropriate progression path. In some cases, the linking module may be trained on historical phase transition data, including factors such as measured outcome values, cultural adaptation scores, system usage patterns, and success rates of prior entities advancing between phases. Using supervised or reinforcement learning techniques, the linking module may predict the best path forward by estimating transition likelihoods and selecting directional links that maximize long-term coaching outcomes. In this way, directional links may serve not only as static representations of process order but also as adaptive pathways that reflect both the structure of the process framework 146 and the evolving performance of the represented entity 120.

With continued reference to FIG. 1, in an embodiment, chaining the phase objects in sequence may include encoding a cyclical link 156 from a terminal phase object 158 to an initial phase object 160. For purposes of this disclosure, a "cyclical link" is a defined connection that closes a sequence of phase objects by associating the final phase of a recurring state process progression with the initial phase of the next iteration. The cyclical link 156 may thereby encode the repetitive and iterative nature of a coaching cycle. In some embodiments, the terminal phase object 158 may correspond to execution, where outcomes and adoption levels are assessed, and the initial phase object 160 may correspond to diagnosis, where new baselines and improvement opportunities are identified. In an embodiment, encoding cyclical links may ensure that the state sequence database 130 can represent not only linear progressions through diagnosis, audit, implementation, and execution, but also the transition from one completed cycle into the next. In certain implementations, cyclical links may carry metadata such as timestamps, performance summaries, and/or readiness indicators, allowing system 100 to contextualize how one cycle's terminal outcomes inform the next cycle's initial assessment. By maintaining cyclical links, system 100 may support its adaptive flywheel design, compounding growth and predictive accuracy over time by explicitly modeling the looped progression of law firm clients through recurring coaching phases.

In continued reference to FIG. 1, in some embodiments, the encoding of cyclical links may also serve as a trigger for alert generation when certain recurring patterns indicate a risk of adverse or counterproductive outcomes. For example, if cyclical links repeatedly connect an implementation-phase object back to a diagnosis-phase object without passing through execution, this may signal that a firm is unable to operationalize recommended changes. In such cases, system 100 may generate an alert indicating that the represented entity 120 is cycling ineffectively, allowing administrators or coaches to intervene before the cycle repeats. In an embodiment, alerts may also be generated where cyclical links suggest regression loops, such as repeated transitions from audit back to diagnosis, that may stall progress toward long-term goals. In some embodiments, the alerting mechanism may be configurable, wherein thresholds are defined for how many cycles of reiteration are permissible before intervention is required. In other embodiments, the linking module may analyze entity input data 118, adaptation scores, and/or usage indicators associated with the cyclical link 156 and flag situations where the predicted trajectory is maleficent toward a target outcome, such as cultural disengagement or declining adoption rates. By appending alerts to cyclical link 156 patterns, system 100 may proactively insert itself into the coaching workflow, ensuring that intervention occurs before unproductive cycles undermine the adaptive flywheel progression.

Still referring to FIG. 1, in an embodiment, chaining the phase objects in sequence may include modifying at least one directional link 154 across recurring state process progressions as a function of refining the policy parameters 136 of the represented entity 120. For purposes of this disclosure, "policy parameters" are configurable variables or learned weights that govern how transitions between process phases are determined, prioritized, or constrained within the system. In some embodiments, policy parameters 136 may include thresholds for measured outcome values (e.g., revenue growth minimums), weightings applied to adaptation metrics (e.g., cultural adoption vs. leadership alignment), or tolerances for system usage indicators (e.g., minimum required dashboard engagement). In an embodiment, modifying directional links as a function of refining policy parameters 136 may allow the linking module to dynamically reroute a represented entity's progression based on updated data. For example, if updated policy parameters 136 increase the importance of cultural adoption scores, an entity that would otherwise progress from audit to implementation may instead be redirected back to diagnosis for further evaluation. In other cases, system 100 may shorten the cycle by advancing an entity directly from audit to execution if policy parameters 136 indicate that performance thresholds and adaptation metrics are already satisfied. By enabling directional links to be modified as policy parameters 136 evolve, system 100 may ensure that recurring process progressions adapt over time, reflecting both individualized coaching needs and the cumulative learning of the adaptive flywheel.

In further reference to FIG. 1, in some embodiments, system 100 may also maintain records of alternate iterations where directional links resulted in failed progressions or were later identified as mistakes. These iterations may be stored in the state sequence database 130 as shadow or archival chains, tagged with metadata indicating their status as non-preferred or overridden. By preserving these alternate paths, the system enables rapid resurfacing and correction, allowing coaches or automated modules to review what occurred, compare against corrected progressions, and reinstate valid directional links without losing historical context. This approach ensures that errors or misrouted cycles do not erase valuable data while still supporting transparent refinement of the represented entity's progression.

In further reference to FIG. 1, in an embodiment, each link 164 between each phase object of the set of phase objects 122 may include a transition weight 162 including a likelihood of progression 166 from one process phase to a subsequent process phase. For purposes of this disclosure, a "likelihood of progression" is a probabilistic measure that expresses the relative chance that a represented entity 120 will advance from one process phase to another based on available entity input data 118, policy parameters 136, and historical performance patterns. In some embodiments, transition weights 162 may be calculated using statistical models, reinforcement learning outputs, and/or predictive algorithms trained on prior cycles. For example, a transition weight 162 between an audit-phase object and an implementation-phase object may be set to a high likelihood if measured outcomes meet baseline thresholds and cultural adaptation scores exceed a defined minimum. Conversely, the likelihood of progression 166 from implementation to execution may be reduced if system usage indicators fall below required engagement levels. In further embodiments, transition weights 162 may be dynamic, updating as new data is ingested, or adaptive, shifting as policy parameters 136 are refined by the adaptation module. By encoding likelihood of progression 166 within each link, system 100 can represent not only the structural order of the coaching cycle but also the probabilistic readiness of each represented entity 120 to advance, thereby enabling more individualized pacing and proactive intervention when progression probabilities are low.

Still Referring to FIG. 1, in some embodiments, the likelihood of progression 166 may be calculated using one or more predictive modeling techniques applied to entity input data 118 and historical progression records. In an embodiment, a baseline approach may employ statistical models, such as logistic regression or Bayesian classifiers, which evaluate the probability of advancing based on outcome values, adaptation metrics, and system usage indicators relative to predefined thresholds. More advanced implementations may incorporate machine-learning models, such as gradient boosted trees or ensemble classifiers, which combine multiple features to capture nonlinear relationships between performance measures and progression outcomes. In certain embodiments, reinforcement learning algorithms may be used to dynamically update progression probabilities, wherein the model assigns rewards to transitions that lead to successful long-term outcomes and penalties to regressions or ineffective cycles. Additionally, recurrent neural networks or transformer-based architectures may be applied to model sequential dependencies, allowing the system to learn how earlier phases in a cycle influence later readiness outcomes. These models may be trained on historical process data across multiple entities, fine-tuned with cycle-specific performance feedback, and updated after each iteration by an adaptation module. By combining statistical, machine-learning, and reinforcement learning techniques, system 100 may generate a robust estimate of progression likelihood that adapts to both individual entity behavior and collective trends observed across cycles.

In continued reference to FIG. 1, in some embodiments, each calculated likelihood of progression 166 may also be accompanied by a confidence interval or uncertainty estimate, providing a measure of reliability for the predicted probability. For example, statistical models may output standard errors that define upper and lower bounds for the likelihood, while machine-learning ensembles may provide variance measures across multiple sub-models. In reinforcement learning contexts, uncertainty may be derived from exploration-exploitation balances or from the variance of reward distributions observed across cycles. By attaching uncertainty measures to progression likelihoods, system 100 may differentiate between high-confidence predictions, where historical data and current inputs strongly support advancement, and low-confidence predictions, where data is sparse, noisy, or conflicting. These estimates may be stored alongside transition weights 162 in the state sequence database 130 and optionally surfaced in dashboards as error bars, shading, or confidence bands, thereby allowing both automated modules and human coaches to interpret not only the probability of progression but also the level of certainty in that assessment.

With continued reference to FIG. 1, in some embodiments, transition weights 162 may be aggregated or visualized to provide higher-level insights into the readiness of a represented entity 120 or across multiple entities. For instance, system 100 may generate a probability distribution that illustrates the relative likelihoods of advancing to different subsequent phases, allowing both coaches and automated modules to compare potential progression paths. In an embodiment, these distributions may be surfaced in dashboards as graphical indicators, such as weighted arrows between phases or probability bars aligned with phase identifiers 132. In other embodiments, transition weights 162 across multiple entities may be averaged or clustered to highlight common progression bottlenecks, such as low probabilities of moving from implementation to execution, thereby enabling targeted adjustments to policy parameters 136 or coaching strategies. By aggregating and visualizing transition weights 162, system 100 may provide interpretable outputs that make probabilistic readiness assessments actionable at both the individual and organizational level.

In continued reference to FIG. 1, in an embodiment, at least a processor 108 may be configured to refine, using a reinforcement learning model 134, policy parameters 136 of the represented entity 120 as a function of the recurring state process progression. For purposes of this disclosure, a "reinforcement learning model" is a machine-learning framework in which an agent learns to make sequential decisions by interacting with an environment, receiving feedback in the form of rewards or penalties, and updating its decision-making strategy to maximize long-term outcomes. In some embodiments, system 100 may implement the reinforcement learning model 134 as the decision-making agent, with the recurring state process progression serving as the environment and observed performance outcomes providing the reward signals. The reinforcement learning model 134 may explore different ways of weighting transition probabilities, setting thresholds, and/or selecting phase objects, and then refine its strategy as process cycles unfold. By grounding refinement in reinforcement learning, system 100 may adaptively improve its ability to predict when and how a represented entity 120 should progress through the diagnosis, audit, implementation, and execution phases, ensuring that policy parameters 136 evolve in response to both individual entity performance and aggregate patterns across multiple cycles.

With continued reference to FIG. 1, in an embodiment, refining the policy parameters 136 of the represented entity 120 may include receiving response signals 170 derived from execution of one or more phase objects of the recurring state process progression. For purposes of this disclosure, a "response signal" is a feedback indicator generated as a result of executing a process phase. In an embodiment, the content of the response signal may reflect how the represented entity 120 performed relative to the goals, thresholds, and/or conditions defined for that phase. In some embodiments, response signals 170 may be quantitative, such as measured outcome values showing improvements in matter turnaround times or revenue growth, or adaptation metrics reflecting increased cultural adoption scores. In other embodiments, response signals 170 may be qualitative or derived, such as sentiment extracted from narrative feedback, usage patterns of workflow systems, or probabilistic readiness values 140 computed by predictive models. In certain implementations, response signals 170 may also encode error states or deviations, such as repeated regressions from implementation to audit, which may signal the need for intervention. By capturing response signals 170 from the execution of phase objects, system 100 may provide the reinforcement learning model 134 with the feedback necessary to reward beneficial progressions and penalize unproductive or maladaptive ones, thereby enabling refinement of policy parameters 136 over successive process cycles.

Still referring to FIG. 1, in an embodiment, refining the policy parameters 136 of the represented entity 120 may include adjusting, using the reinforcement model, the policy parameters 136 as a function of the response signals 170. For purposes of this disclosure, a "readiness value" is a computed indicator that represents the degree to which a represented entity 120 is prepared to advance from a current process phase to a subsequent process phase. In an embodiment, the policy parameters 136 may include one or more of a transition weights 162 assigned to a link 164 between each phase object of the set of phase objects 122, a threshold 172 used to compute the readiness value 140, and a selection of phase objects 174 included in the recurring state process progression. In some embodiments, the reinforcement learning model 134 may adjust transition weights 162 assigned to links between phase objects by increasing weights where response signals 170 indicate successful advancement and decreasing weights where response signals 170 indicate regression or failure. In other embodiments, the model may adjust thresholds 172 used to compute readiness values 140, such as raising the required cultural adoption score for advancing from audit to implementation or lowering the required usage indicator for moving from implementation to execution. In further embodiments, refinement may include modifying the selection of phase objects 174 that compose the recurring state process progression, for instance by adding a reiterative audit phase for entities with low adoption scores or bypassing certain sub-phases when outcome values already exceed performance benchmarks. By dynamically adjusting policy parameters 136 in response to observed signals, the reinforcement learning model 134 may enable system 100 to adapt process cycles to the evolving performance of each represented entity 120, thereby personalizing pacing and compounding improvement across successive iterations.

With further reference to FIG. 1, in an embodiment, at least a processor 108 may be configured to compute, using a transition evaluation model 138, a readiness value 140 as a function of the entity input data 118 and the recurring state process progression. For purposes of this disclosure, a "transition evaluation model" is a computational framework that analyzes entity input data 118 and historical phase object records to estimate the preparedness of a represented entity 120 to advance from a current process phase to a subsequent process phase. In some embodiments, the transition evaluation model 138 may integrate both deterministic rules, such as predefined thresholds for outcome values or usage indicators, and probabilistic measures, such as transition weights 162 derived from reinforcement learning. In an embodiment, the transition evaluation model 138 may evaluate readiness by combining raw entity input data 118 (e.g., survey scores, adoption rates, revenue metrics) with structured metadata 176 stored in phase objects across prior cycles, thereby producing a readiness value 140 that reflects both present performance and historical progression. By employing the transition evaluation model 138, system 100 may ensure that readiness is not computed as a static score but rather as a contextualized measure that accounts for longitudinal trends in the recurring state process progression, resulting in more accurate and individualized advancement decisions.

In further reference to FIG. 1, in an embodiment, the readiness value 140 may include a subsequent phase indication 168. For purposes of this disclosure, a "subsequent phase indication" is an output signal generated by the transition evaluation model 138 that identifies which process phase a represented entity 120 is most likely prepared to enter following its current phase. In some embodiments, the subsequent phase indication 168 may correspond to the next phase in the nominal order of the process cycle, such as diagnosis leading to audit, audit leading to implementation, or implementation leading to execution. In other embodiments, the subsequent phase indication 168 may reflect a non-linear progression, such as regression from implementation back to audit when adoption thresholds are not met, or reiteration of the same phase when additional refinement is required before advancement. By incorporating the subsequent phase indication 168 into the readiness value 140, system 100 may provide explicit guidance as to the optimal next step for the represented entity 120, while still preserving flexibility to capture complex trajectories that do not always follow a simple linear progression. This may enable the process cycle to adapt to real-world performance and ensure that entities advance only when indicators demonstrate sufficient preparedness.

In continued reference to FIG. 1, in an embodiment, the transition evaluation model 138 may be configured to compute the readiness value 140 as a function of a transition weight 162 associated with each link 164 between each phase object of the set of phase objects 122 and the entity input data 118. In some embodiments, the transition evaluation model 138 may evaluate the probability of advancement by combining transition weights 162, which encode the likelihood of progression 166 between phases, with current entity input data 118 that reflects the represented entity's present state. For example, if the transition weight 162 between audit and implementation is high due to historical success patterns, and the entity input data 118 indicates that cultural adoption scores and usage metrics exceed defined thresholds 172, the resulting readiness value 140 may strongly favor advancement into implementation. Conversely, if entity input data 118 falls below required thresholds, the transition evaluation model 138 may lower the readiness value 140 for forward progression, even when historical transition weights 162 are favorable. In certain cases, the model may also consider multiple weighted links simultaneously, such as evaluating both a forward link 164 to implementation and a backward link 164 to diagnosis, selecting the subsequent phase indication 168 that maximizes long-term readiness. By integrating transition weights 162 with current data inputs, the transition evaluation model 138 may ensure that readiness values 140 account for both the statistical tendencies of prior process cycles and the unique, real-time context of the represented entity 120.

Still referring to FIG. 1, in an embodiment, computing the readiness value 140 may include accessing structured metadata 176 stored in the set of phase objects 122 and the entity input data 118. For purposes of this disclosure, "structured metadata" refers to organized descriptive information that provides context, categorization, and traceability for data stored in the system. For example, structured metadata 176 may include, but is not limited to field labels, timestamps, phase identifiers 132, source attributes, and/or normalization details. In some embodiments, the transition evaluation model 138 may query structured metadata 176 in order to ensure that outcome values, adaptation metrics, and usage indicators are interpreted within the correct phase context. For example, metadata linking a cultural adoption score to the audit phase may allow the model to weigh that value specifically in relation to audit-to-implementation transitions, while a usage indicator tagged with the execution phase may ensure it is only considered when evaluating long-term adoption. In an embodiment, structured metadata 176 may also include historical markers, such as cycle identifiers, which allow readiness values 140 to incorporate longitudinal patterns across multiple iterations. By systematically accessing structured metadata 176 alongside raw entity input data 118, the transition evaluation model 138 may ensure that each readiness computation is grounded in accurate context, enabling comparisons across process cycles and preventing misclassification of values when phase data overlaps or recurs.

With further reference to FIG. 1, in an embodiment, computing the readiness value 140 may include applying a predictive algorithm 178 that has been trained on recurring state process progression data 180 of one or more represented entities 182 to the structured metadata 176. For purposes of this disclosure, "recurring state process progression data" is historical information that captures how a represented entity 120, or a plurality of represented entities, has traversed process phases over successive process cycles. In an embodiment this may include the sequence of phase objects, the transition weights 162 between phases, the readiness values 140 computed at each stage, and/or the response signals 170 derived from phase execution. For purposes of this disclosure, a "predictive algorithm" is a computational model that estimates future outcomes based on patterns identified in historical data. In some embodiments, the predictive algorithm 178 may be implemented as a regression model, a decision tree ensemble, or a neural network configured to recognize relationships between structured metadata 176 and observed progression outcomes. In a non-limiting example, the training data may include recurring state process progression data 180 aggregated across multiple entities, such as phase object sequences, recorded thresholds, adaptation metrics, and outcome values associated with prior cycles. By exposing the predictive algorithm 178 to such data, the model may learn correlations such as the relationship between cultural adoption scores and successful advancement into implementation, and/or the relationship between usage indicators and sustained execution outcomes. When applied to the structured metadata 176 of a current entity, the predictive algorithm 178 may compute a readiness value 140 that reflects not only the entity's immediate performance but also broader trends observed across similar entities and prior cycles. This may enable system 100 to improve accuracy, generalizability, and adaptability in readiness predictions.

With continued reference to FIG. 1, in an embodiment, the predictive algorithm 178 may be trained on recurring state process progression data 180 specific to the represented entity 120. In an embodiment, the predictive algorithm 178 may be initially trained on recurring state process progression data 180 aggregated across a plurality of represented entities, thereby establishing a generalized model capable of capturing broad correlations between structured metadata 176 and successful phase transitions. In some embodiments, this generic model may then be refined or adapted using a subset of training data specific to the represented entity 120. The entity-specific subset may include prior cycles recorded in the state sequence database 130 for that entity, such as its phase object sequences, transition weights 162, response signals 170, and previously computed readiness values 140. By layering entity-specific training onto a generalized baseline, the predictive algorithm 178 may preserve the advantages of cross-entity generalizability while also adapting to the unique operational patterns, cultural dynamics, and performance trends of the particular represented entity 120. For example, one entity may consistently exhibit high system usage indicators as an early predictor of execution success, while another may show stronger dependence on cultural adaptation metrics to drive progression. In some embodiments, this adaptation may be implemented through incremental fine-tuning, wherein each new process cycle supplements the entity-specific training set and updates the model parameters. In this way, the predictive algorithm 178 evolves over time to balance population-level insights with the individualized trajectory of the represented entity 120, thereby producing readiness values 140 that are both contextually relevant and dynamically personalized.

In continued reference to FIG. 1, in an embodiment, computing the readiness value 140 may include generating the readiness value 140 as a function of applying the predictive algorithm 178 to the structured metadata 176. In some embodiments, the structured metadata 176 accessed from phase objects and entity input data 118 may be transformed into a feature vector, wherein each element of the vector corresponds to a normalized representation of an outcome value, adaptation metric, or system usage indicator. In an embodiment, the predictive algorithm 178 may then process this feature vector by applying its trained weights and thresholds 172, whether derived from generic cross-entity training, entity-specific fine-tuning, or both, to compute a readiness value 140 that quantifies the likelihood of successful advancement to a subsequent phase. In certain cases, the readiness value 140 may be expressed as a scalar score bounded within a defined numerical range (e.g., 0 to 1 or 0 to 100), while in other cases it may be produced as a categorical label (e.g., "ready," "not ready," or "reiterate") depending on the implementation of the transition evaluation model 138. By grounding the readiness computation in structured metadata 176, system 100 may ensure that the output reflects both the phase-specific context encoded in the metadata and the broader progression patterns captured by the predictive algorithm 178. This may enable readiness values 140 to be generated consistently across entities and process cycles, while still allowing system 100 to adapt to the unique circumstances of each represented entity 120.

With further reference to FIG. 1, in some embodiments, the readiness value 140 may be represented not only as a single scalar score or categorical label but also as a more complex statistical object. For example, the readiness value 140 may include a probability distribution across multiple potential subsequent phases, thereby indicating not only the most likely progression path but also the relative confidence in alternative trajectories. In other embodiments, the readiness value 140 may include confidence intervals or error bounds derived from the predictive algorithm's internal uncertainty estimates, which may be particularly useful when input data is sparse, noisy, or contradictory. Still further, the readiness value 140 may be expressed as a trajectory over time, wherein successive computations reveal whether an entity is trending toward higher preparedness or signaling stagnation or regression. By supporting these optional representations, system 100 may provide administrators, coaches, or automated decision modules with richer interpretive tools for determining how and when to advance a represented entity 120 within its recurring state process progression.

Still referring to FIG. 1, in an embodiment, at least a processor 108 may be configured to output an entity-specific set of phase objects 142 and the readiness value 140 for use in execution of a subsequent state process progression 144 of the represented entity 120. For purposes of this disclosure, an "entity-specific set of phase objects" is a collection of phase objects that are generated, configured, and maintained in association with a represented entity 120. In an embodiment, the set of phase objects 122 in the entity-specific set of phase objects 142 may reflect the entity's unique progression through one or more process cycles. In some embodiments, the entity-specific set of phase objects 142 may differ across entities even when the underlying process framework 146 is the same, since variations in entity input data 118, transition weights 162, and response signals 170 may cause fields within each phase object to reflect entity-specific trajectories. In an embodiment, at least a processor 108 may output this entity-specific set, along with the readiness value 140, as an operational package that informs the continuation of the recurring state process progression. In doing so, system 100 may ensure that each subsequent process cycle begins with both a structured historical record of phase performance and a computed measure of preparedness, enabling execution pathways that are dynamically adapted to the individual characteristics and progress of the represented entity 120.

In further reference to FIG. 1, in an embodiment, the entity-specific set of phase objects 142 and the readiness value 140 may be stored in the state sequence database 130 for initializing the subsequent state process progression 144 of the represented entity 120. In some embodiments, storage of this information may occur as a committed record that links phase object fields, directional links, transition weights 162, and the computed readiness value 140 into a retrievable package indexed by the entity's identifier and the process cycle in which it was generated. In an embodiment, storing these records may enable system 100 to bootstrap a subsequent process cycle with a structured initialization layer that incorporates not only the results of prior phases but also the readiness evaluation of whether progression should occur and in what direction. In certain implementations, the stored readiness value 140 may act as a trigger for the initialization routine, selecting the most appropriate entry point into the process framework 146, whether that is a forward advancement, reiteration, or regression to a prior phase. In this way, the state sequence database 130 may operate not merely as archival storage but as an active substrate for adaptive progression, ensuring that each new process cycle begins with individualized context derived from the represented entity's historical trajectory.

With continued reference to FIG. 1, in an embodiment, the entity-specific set of phase objects 142 and the readiness value 140 stored in the state sequence database 130 may be retrieved by at least a processor 108 for initializing and guiding execution of the subsequent state process progression 144. In some embodiments, retrieval may occur automatically at the onset of a new cycle, wherein the stored readiness value 140 determines which process phase is instantiated first and how transition conditions are parameterized. In other embodiments, retrieval may be triggered by an administrator or user through an interface, enabling human oversight in selecting or confirming the entry point into the process framework 146. Once retrieved, the entity-specific set of phase objects 142 may populate downstream modules, such as dashboard visualization tools, predictive coaching workflows, and/or adaptation modules that dynamically refine thresholds 172. In an embodiment, the readiness value 140 may serve as an anchor variable, influencing conditional logic in workflow engines or serving as a gating condition for automated triggers, such as deploying new audit tasks or generating alerts when readiness remains below target thresholds. By structuring execution around the stored entity-specific set of phase objects 142 and readiness value 140, system 100 may ensure continuity between cycles, minimize redundant data entry, and support a self-reinforcing adaptive loop in which prior outcomes directly shape future execution.

Still referring to FIG. 1, in an embodiment, the entity-specific set of phase objects 142 and the readiness value 140 may be surfaced in one or more user-facing contexts to provide actionable insight into the represented entity's state process progression. In some embodiments, surfacing may occur through a dashboard interface that visualizes phase objects as nodes in a progression map, with directional links indicating potential next steps and the readiness value 140 highlighted as a score or indicator adjacent to the current phase. In other embodiments, the readiness value 140 may be surfaced through alerting mechanisms, such as notifications sent to administrators when a represented entity 120 remains in a phase beyond expected thresholds or when cyclical links indicate risk of maladaptive repetition. Still further, surfacing may take the form of periodic reports automatically generated by system 100, which may summarize readiness trends across cycles and identify emerging bottlenecks or accelerators within a firm's process cycle. By presenting the entity-specific set of phase objects 142 and readiness value 140 in these accessible formats, system 100 may enable stakeholders to interpret, validate, and act upon the adaptive recommendations produced by the transition evaluation model 138, thereby ensuring that technical outputs translate into meaningful interventions in the real-world coaching and process environment.

In continued reference to FIG. 1, in an embodiment, the entity-specific set of phase objects 142 and the readiness value 140 may be integrated with one or more external systems or downstream decision modules to extend the functionality of system 100. In some embodiments, integration may occur through application programming interfaces (APIs) that enable external workflow engines, enterprise resource planning (ERP) platforms, or project management systems to consume readiness values 140 and phase object data in real time. For example, a high readiness value 140 for progression into an implementation phase may trigger the automatic creation of project milestones in an external task management platform, while a low readiness value 140 may generate a compliance audit task in a separate quality assurance system. In other embodiments, integration may occur with adaptation modules or reinforcement learning pipelines that refine thresholds, transition weights 162, or policy parameters based on external performance data streams. Still further, external reporting systems may query the state sequence database 130 directly to generate cross-entity benchmarking dashboards, enabling comparative analysis across firms while preserving entity-specific privacy constraints. By embedding the entity-specific set of phase objects 142 and readiness value 140 into a larger ecosystem of connected systems, system 100 may ensure that outputs are not siloed within the core platform but instead function as interoperable signals that drive coordinated action across both internal and external decision environments.

Figure 2:
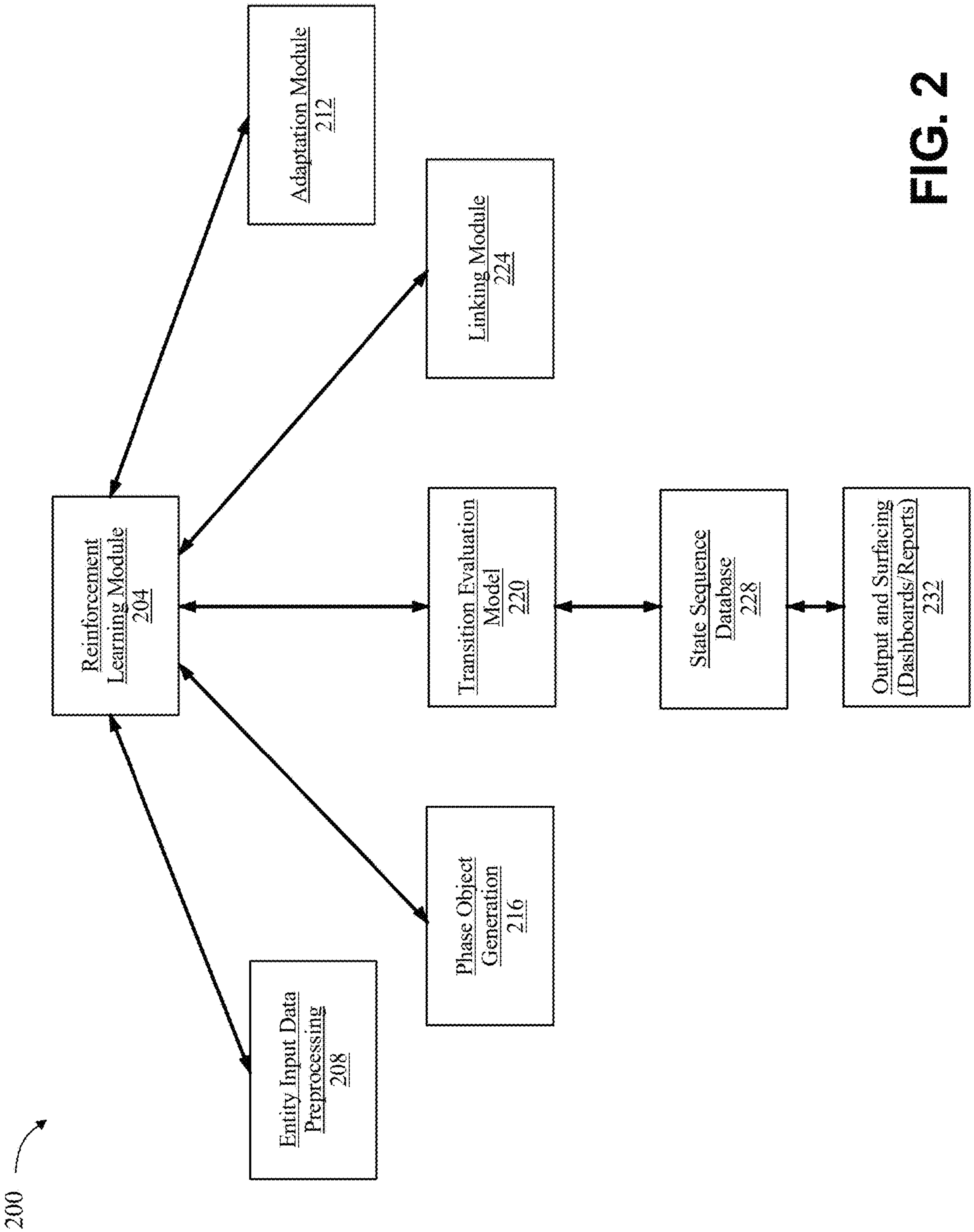
FIG. 2 is an exemplary system diagram including a reinforcement learning module operably connected to a plurality of other modules and models.

Now referring to FIG. 2, an exemplary system diagram 200 including a reinforcement learning module 204 operably connected to a plurality of other modules and models as described throughout system 100 in reference to FIG. 1. Bi-directional arrows are shown between reinforcement learning module 204 and the other modules, indicating both adaptive influence and responsive feedback. In an embodiment, system diagram 200 may highlight reinforcement learning module 204 as a global adaptive layer that permeates the system architecture, ensuring that updates from recurring process cycles continuously recalibrate the behavior of downstream models and upstream preprocessing operations.

In continued reference to FIG. 2, in some embodiments, reinforcement learning module 204 may be in communication with entity input data preprocessing 208. In an embodiment, entity input data preprocessing 208 may output normalized, validated, and semantically enriched streams of entity input data, which form the initial conditions for readiness evaluation and phase object instantiation. Reinforcement learning module 204 may in turn adapt the logic of preprocessing 208 by modifying thresholds, schema definitions, and/or feature selection pipelines when reward signals indicate that specific forms of preprocessing yield more predictive or stable readiness values. In this way, feedback from reinforcement learning module 204 may ensure that data quality and representational fidelity evolve dynamically across process cycles.

With further reference to FIG. 2, in an embodiment, reinforcement learning module 204 may also exchange information with adaptation module 212, which may manage ongoing updates to policy parameters, transition thresholds, and phase-specific rules. Adaptation module 212 may supply reinforcement learning module 204 with recalibrated thresholds and/or revised metadata mappings, while reinforcement learning module 204 may provide adaptation module 212 with reward and penalty signals that weight the effectiveness of those updates in practice. This bidirectional exchange may enable the system to converge more rapidly on policy parameters that are both entity-specific and generalizable across multiple process cycles.

Still referring to FIG. 2, in an embodiment, phase object generation 216 may further interact with reinforcement learning module 204. Phase object generation 216 may be responsible for instantiating data structures that represent process phases, including fields for outcome values, adaptation metrics, and/or usage indicators. In an embodiment, reinforcement learning module 204 may refine this generation process by emphasizing the creation of fields or nested structures that have been empirically associated with improved prediction accuracy or smoother transitions between phases. Conversely, phase object generation 216 may feed reinforcement learning module 204 with statistics about field utilization, sparsity, and/or correlation strength, providing additional signal for model updates.

In further reference to FIG. 2, in an embodiment, reinforcement learning module 204 may additionally operate in concert with transition evaluation model 220. Transition evaluation model 220 may apply transition weights, thresholds, and/or structured metadata to compute readiness values. In an embodiment, reinforcement learning module 204 may adjust the weighting functions, exploration-exploitation balance, or loss criteria used by transition evaluation model 220 to refine progression predictions. In return, transition evaluation model 220 may provide reinforcement learning module 204 with observed outcomes, such as whether predicted readiness values aligned with actual advancement or regression events. This tight feedback loop may ensure that reinforcement learning updates are grounded in empirical outcomes observed within the system.

With continued reference to FIG. 2, in an embodiment, linking module 224 may also maintain a feedback relationship with reinforcement learning module 204. Linking module 224 may define directional and cyclical connections between phase objects, including forward, backward, and reiterative links. In an embodiment, reinforcement learning module 204 may propose adjustments to link probabilities or introduce alternative progression pathways when training results show that conventional transitions are less effective for certain entities. At the same time, linking module 224 may return observed navigation patterns, anomalies, or cycle completion statistics, all of which may contribute to refining reinforcement learning module 204's policy space.

Still referring to FIG. 2, in an embodiment, reinforcement learning module 204 may interact with state sequence database 228 by consuming longitudinal recurring state process progression data. State sequence database 228 may provide reinforcement learning module 204 with historical sequences of phase objects, recorded transition weights, and associated readiness values. In an embodiment, reinforcement learning module 204 may then update and return refined linkages, recalibrated policy parameters, and reweighted metadata associations for storage. In some embodiments, this exchange may occur asynchronously, enabling reinforcement learning module 204 to train continuously in the background on archived data while concurrently updating live process cycles.

With further reference to FIG. 2, in an embodiment, reinforcement learning module 204 may be operably connected to output and surfacing module 232. Output and surfacing module 232 may be responsible for delivering readiness values, process progression indicators, and alerts to user-facing dashboards or reports. In an embodiment, reinforcement learning module 204 may influence how these values are weighted, visualized, or prioritized for display. In return, reinforcement learning module 204 may receive feedback in the form of user confirmations, overrides, or manual annotations, which may be captured as additional response signals. These signals can be used as reinforcement feedback, aligning the adaptive model's updates with real-world coaching judgments or administrative decisions.

Taken together, the bi-directional connections illustrated in FIG. 2 may emphasize that reinforcement learning module 204 does not function as an isolated component but as an adaptive substrate that interconnects all major subsystems of system diagram 200. By continuously refining preprocessing, phase generation, evaluation, linking, adaptation, and output surfacing, reinforcement learning module 204 may ensure that each subsequent process cycle evolves in response to both historical outcomes and ongoing signals, thereby compounding predictive accuracy and accelerating entity-specific improvements across iterations.

Figure 3:
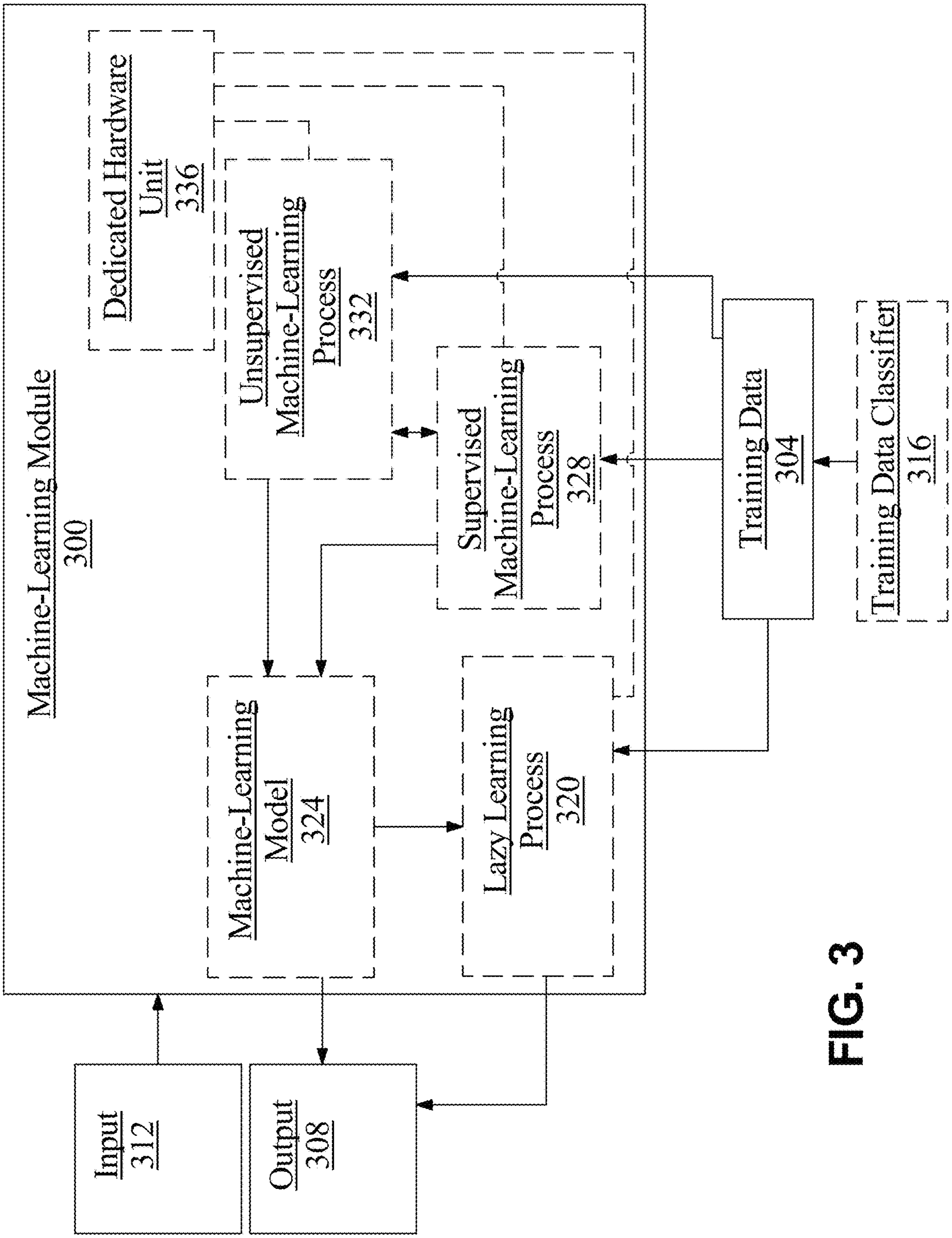
FIG. 3 is an exemplary embodiment of a machine-learning module.

Referring now to FIG. 3, an exemplary embodiment of a machine-learning module 300 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 304 to generate an algorithm instantiated in hardware or software logic, data structures, and/or functions that will be performed by a computing device/module to produce outputs 308 given data provided as inputs 312; this is in contrast to a non-machine learning software program where the commands to be executed are determined in advance by a user and written in a programming language.

Still referring to FIG. 3, "training data," as used herein, is data containing correlations that a machine-learning process may use to model relationships between two or more categories of data elements. For instance, and without limitation, training data 304 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 304 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 304 according to various correlations; correlations may indicate causative and/or predictive links between categories of data elements, which may be modeled as relationships such as mathematical relationships by machine-learning processes as described in further detail below. Training data 304 may be formatted and/or organized by categories of data elements, for instance by associating data elements with one or more descriptors corresponding to categories of data elements. As a non-limiting example, training data 304 may include data entered in standardized forms by persons or processes, such that entry of a given data element in a given field in a form may be mapped to one or more descriptors of categories. Elements in training data 304 may be linked to descriptors of categories by tags, tokens, or other data elements; for instance, and without limitation, training data 304 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 3, training data 304 may include one or more elements that are not categorized; that is, training data 304 may not be formatted or contain descriptors for some elements of data. Machine-learning algorithms and/or other processes may sort training data 304 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 304 to be made applicable for two or more distinct machine-learning algorithms as described in further detail below. Training data 304 used by machine-learning module 300 may correlate any input data as described in this disclosure to any output data as described in this disclosure. As a non-limiting illustrative example, inputs may include entity input data such as adoption survey results, billing turnaround times, and usage indicators extracted from law firm workflow platforms, while outputs may include readiness values, subsequent phase indications, and adjustments to policy parameters that determine whether a client advances from audit to implementation, reiterates a diagnosis phase, or proceeds into execution.

Further referring to FIG. 3, training data may be filtered, sorted, and/or selected using one or more supervised and/or unsupervised machine-learning processes and/or models as described in further detail below; such models may include without limitation a training data classifier 316. Training data classifier 316 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 300 may generate a classifier using a classification algorithm, defined as a processes whereby a computing device and/or any module and/or component operating thereon derives a classifier from training data 304. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 316 may classify elements of training data to identify a cohort of law firm clients demonstrating similar cultural adoption scores, workflow usage indicators, or outcome value patterns, such that subsets of training data may be selected and applied to generate more accurate readiness values and progression predictions for entities within that cohort.

Still referring to FIG. 3, a computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A)P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. A computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 3, a computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 3, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute/as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 3, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. A computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 3, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 3, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 3, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 3, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 3, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 3, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 3, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $$X_{max}: X_{new} = \frac{X - X_{min}}{X_{max} - X_{min}}.$$

Feature scaling may include mean normalization, which involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a a set or subset $X_{median}$ and/or interquartile range (IQR), which represents the difference between the $25^{th}$ percentile value and the $50^{th}$ percentile value (or closest values thereto by a rounding protocol), such as:

$$X_{new} = \frac{X - X_{median}}{IQR}.$$

be aware of various alternative or additional approaches that may be used for feature scaling.

Further referring to FIG. 3, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 3, machine-learning module 300 may be configured to perform a lazy-learning process 320 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 304. Heuristic may include selecting some number of highest-ranking associations and/or training data 304 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 3, machine-learning processes as described in this disclosure may be used to generate machine-learning models 324. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 324 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 324 may be generated by creating an artificial neural network, such as a convolutional neural network comprising an input layer of nodes, one or more intermediate layers, and an output layer of nodes. Connections between nodes may be created via the process of "training" the network, in which elements from a training data 304 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, machine-learning algorithms may include at least a supervised machine-learning process 328. At least a supervised machine-learning process 328, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include inputs as described above as inputs, outputs as described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 304. Persons skilled in the art, upon reviewing the entirety of this disclosure, will be aware of various possible variations of at least a supervised machine-learning process 328 that may be used to determine relation between inputs and outputs. Supervised machine-learning processes may include classification algorithms as defined above.

With further reference to FIG. 3, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Continuing to refer to FIG. 3, evaluation of error function and/or other comparison results may include comparison of each of error function and/or other comparison results to a maximum single error threshold; in other words, a criterion of evaluation may include performing iterative retraining if any single comparison and/or error function output exceeds maximum single error threshold or if a count of single comparison and/or error function outputs exceeding single error threshold exceeds a threshold number and/or proportion of overall error function and/or other comparison results. Alternatively or additionally, evaluation of error function and/or other comparison results may include comparison of an aggregated plurality of error function and/or other comparison results to an aggregate error threshold; in other words, a criterion of evaluation may include performing iterative retraining if a result of averaging or otherwise aggregating a plurality such as some or all evaluated function and/or other comparison results exceeds aggregate error threshold. Aggregation may be performed in any manner of aggregation described in this disclosure and/or any combination thereof. Criteria for evaluations may be evaluated separately such that failing any one criterion causes iterative retraining; alternatively or additionally evaluation results may be combined according to one or more logical or other rules.

As a non-limiting, illustrative example, and still referring to FIG. 3, where outputs to be compared by error function are numerical values, error function may include subtraction of one from the other to derive an absolute value and/or mean squared error. Where outputs and/or training examples are represented as a binary classification, an error function may include a hinge loss function, sigmoid cross entropy loss function, weighted cross entropy loss function, or the like. Where output and/or exemplary output in a training set is a classification to three or more values, error function may include a softmax cross entropy loss function, a sparse cross entropy loss function, a Kullback-Leibler divergence loss function, or the like. Where both retaining and training with include supervised training, retraining may use a different error function, different weight update functions and/or parameters, or the like than in the training stage. For instance, and without limitation, when a previous iterative retraining process included training using examples from until a first convergence threshold and/or epsilon value and/or neighborhood is met, a subsequent iterative retraining process may include a lower convergence threshold, a smaller value of epsilon, or the like. Iterative retraining may include using one or more examples that were not used in any previous training and/or retraining process; for instance, where convergence was initially and/or previously achieved using a first subset of examples a subsequent retraining process may use examples from a second subset of examples, which may be wholly disjoint from first subset and/or have one or more elements that are not found in first subset.

Still referring to FIG. 3, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 3, machine learning processes may include at least an unsupervised machine-learning processes 332. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 332 may not require a response variable; unsupervised processes 332 may be used to find interesting patterns and/or inferences between variables, to determine a degree of correlation between two or more variables, or the like.

Still referring to FIG. 3, machine-learning module 300 may be designed and configured to create a machine-learning model 324 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 3, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 3, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 3, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 3, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 3, one or more processes or algorithms described above may be performed by at least a dedicated hardware unit 336. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 336 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 336 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 336 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 4:
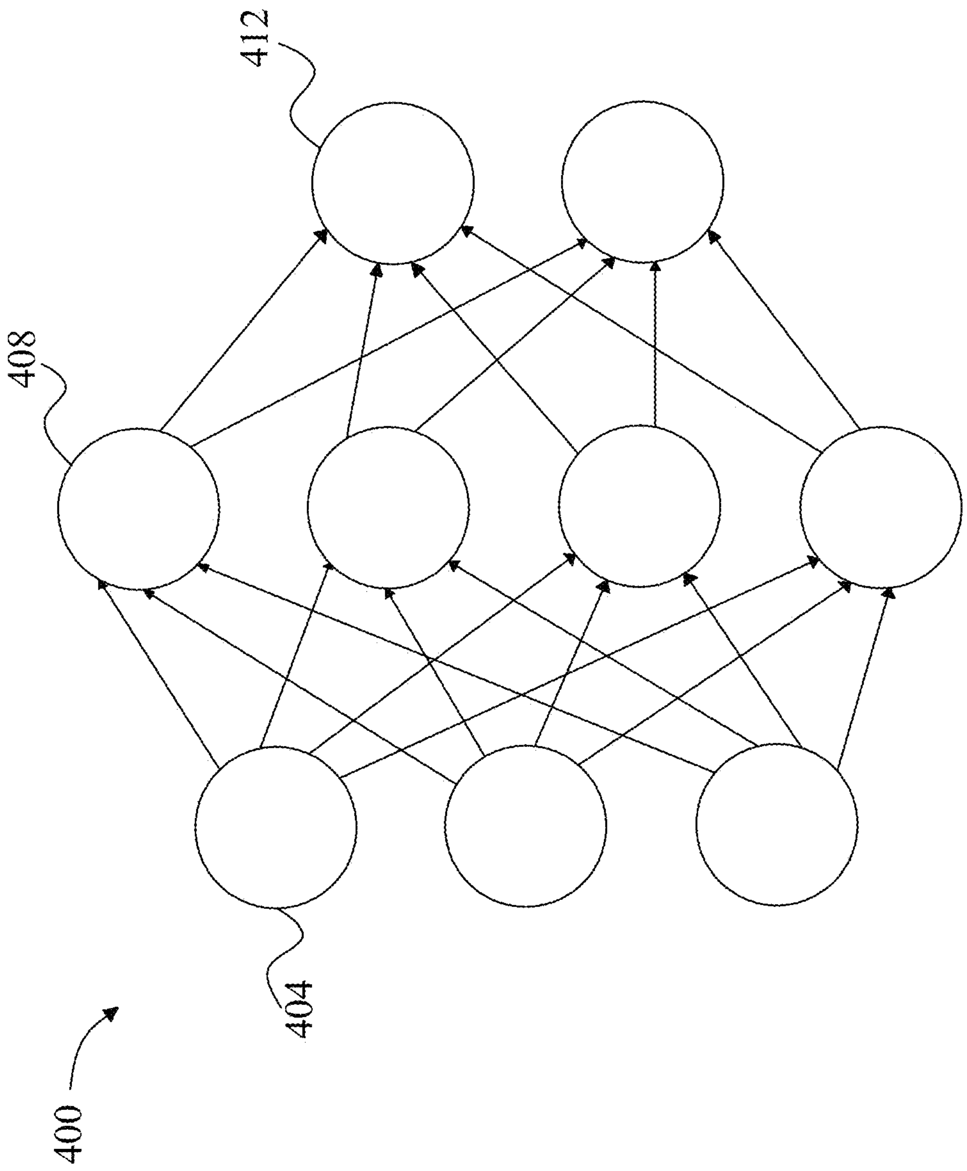
FIG. 4 is an exemplary embodiment of neural network.

Referring now to FIG. 4, an exemplary embodiment of neural network 400 is illustrated. A neural network 400 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
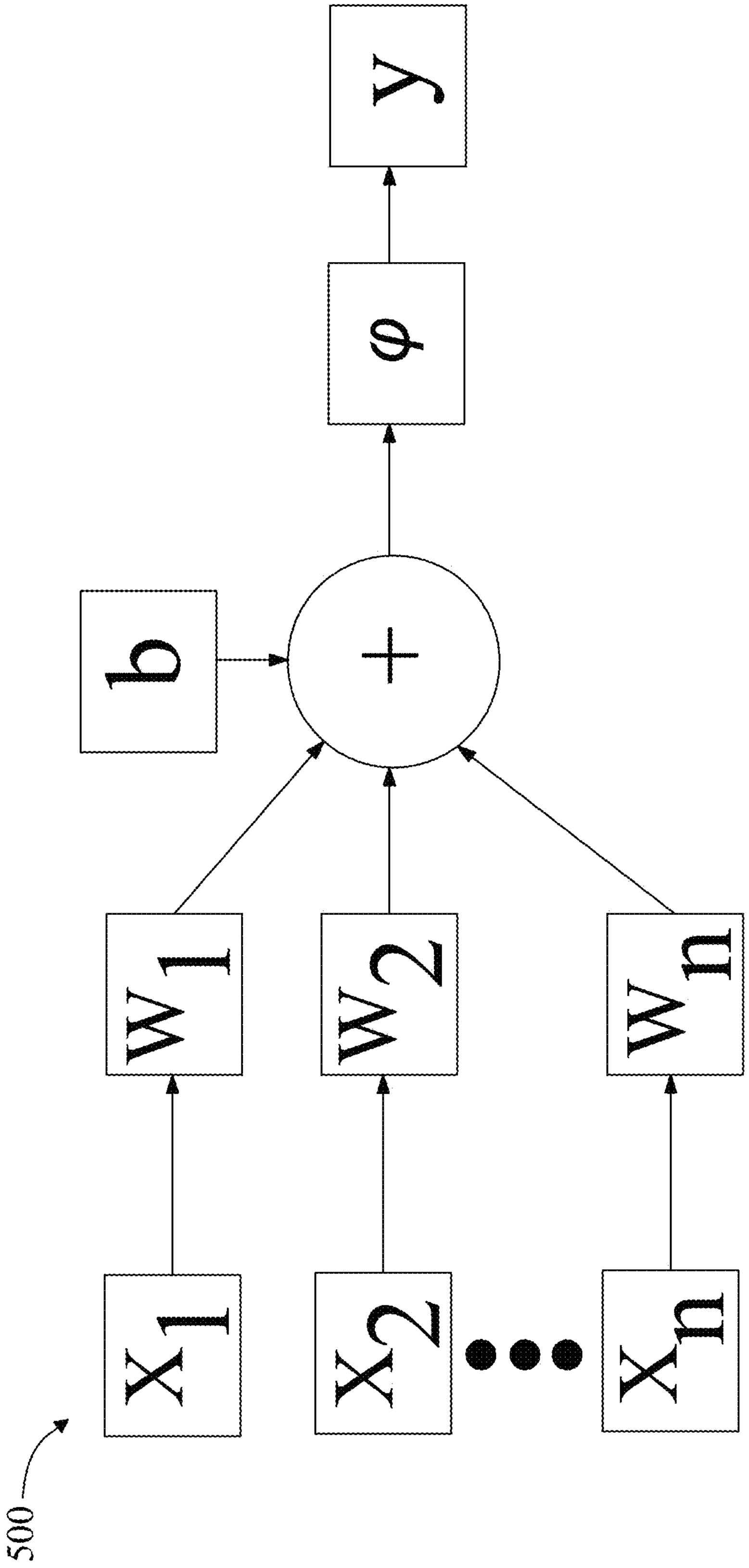
FIG. 5 is an exemplary embodiment of a node of a neural network.

Referring now to FIG. 5, an exemplary embodiment of a node 500 of a neural network is illustrated. A node may include, without limitation a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tan h (hyperbolic tangent) function, of the form $$\frac{e^x - e^{-x}}{e^x + e^{-x}},$$

a tan h derivative function such as $f(x)=\tan h^2(x)$, a rectified linear unit function such as $f(x)=\max(0,x)$, a "leaky" and/or "parametric" rectified linear unit function such as $f(x)=\max(ax,x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as f(x)=x*sigmoid(x), a Gaussian error linear unit function such as f(x)=a(1+tan h(2/π(x+bx^r))) for some values of a, b, and r, and/or a scaled exponential linear unit function such as $$f(x) = \lambda\begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$, or of other coefficients and/or parameters of an activation function, may be determined by training a neural network using training data, which may be performed using any suitable process as described above. Each weight in a neural network may, without limitation, be updated and/or tuned, based on an error function J, using a backpropagation updating method, such as:

$$w_{new} = w_{old} - \alpha\frac{dJ}{dw}$$

where $w_{new}$ is the updated weight value, $w_{old}$ is the previous weight value, α is a parameter to set the learning rate, and $$\frac{dJ}{dw}$$

is the partial derivative of with respect to weight w.

Figure 6:
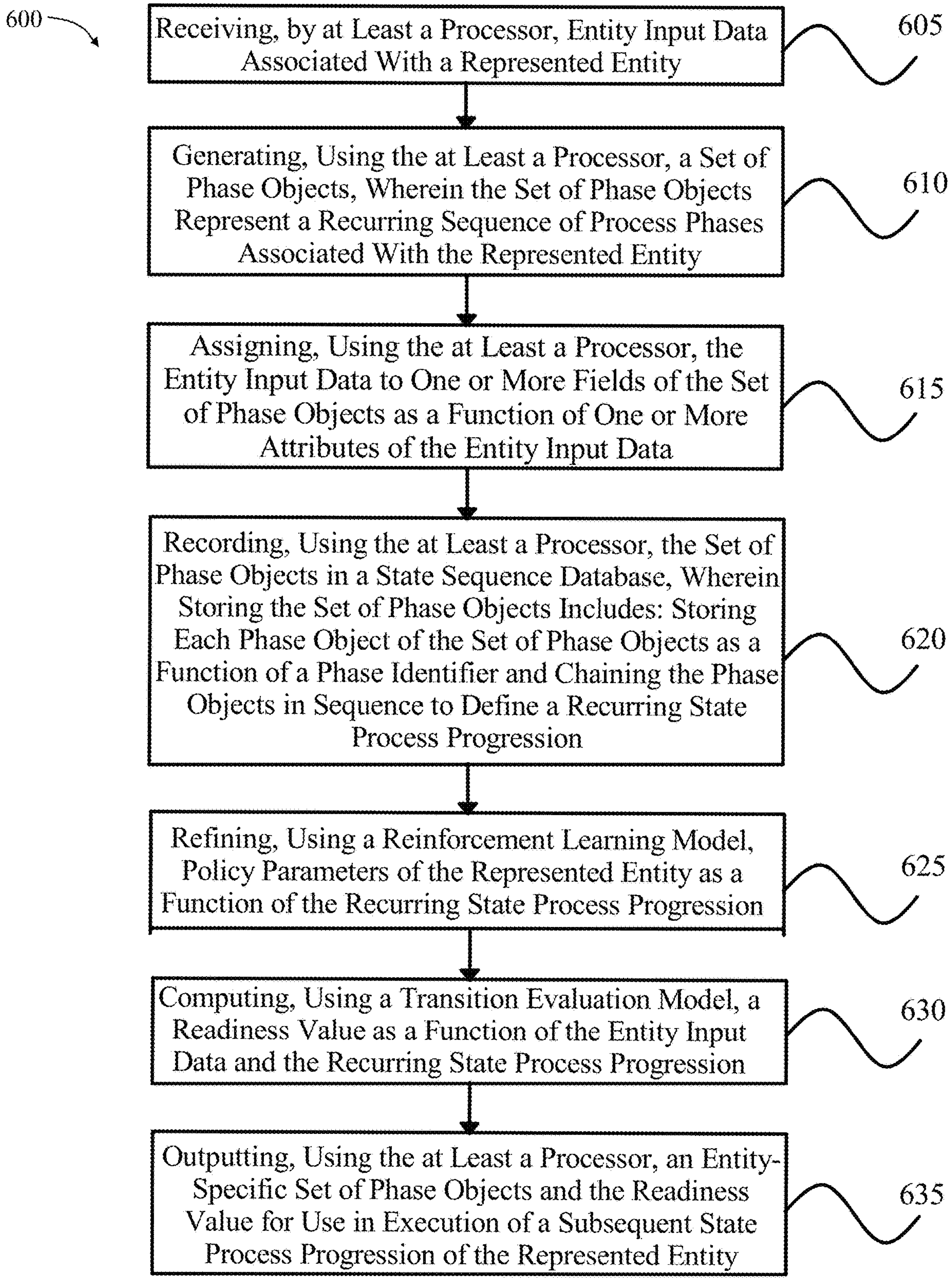
FIG. 6 is a flow diagram of an exemplary method for adaptive coordination or recurring state process progressions for a represented entity.

Referring now to FIG. 6, a flow diagram of an exemplary method 600 for adaptive coordination of recurring state process progressions for a represented entity is illustrated. Method 600 may include a step 605 of receiving, by at least a processor, entity input data associated with a represented entity. In an embodiment, the entity input data may be generated as a function of an interaction between the represented entity and a process framework. This may be implemented, without limitation, as referenced in FIGS. 1-5.

In continued reference to FIG. 6, method 600 may include a step 610 of generating, using the at least a processor, a set of phase objects, wherein the set of phase objects represent a recurring sequence of process phases associated with the represented entity. In an embodiment, generating the set of phase objects may include accessing a predefined rule set, wherein the predefined rule set parameterizes a plurality of process phases, instantiating, for each process phase of the plurality of process phases, a data structure corresponding to each process phase, and defining one or more fields within the data structure to receive values derived from the entity input data. This may be implemented, without limitation, as referenced in FIGS. 1-5.

With further reference to FIG. 6, method 600 may include a step 615 of assigning, using the at least a processor, the entity input data to one or more fields of the set of phase objects as a function of one or more attributes of the entity input data. This may be implemented, without limitation, as referenced in FIGS. 1-5.

Still referring to FIG. 6, method 600 may include a step 620 of recording, using the at least a processor, the set of phase objects in a state sequence database, wherein storing the set of phase objects in the state sequence database includes: storing each phase object of the set of phase objects as a function of a phase identifier and chaining the phase objects in sequence to define a recurring state process progression. In an embodiment, chaining the phase objects in sequence may include defining a directional link from each phase object to a subsequent phase object, encoding a cyclical link from a terminal phase object to an initial phase object, and modifying at least one directional link across recurring state process progressions as a function of refining the policy parameters of the represented entity. In an embodiment, each link between each phase object of the set of phase objects may include a transition weight including a likelihood of progression from one process phase to a subsequent process phase. In an embodiment, computing the readiness value may include accessing structured metadata stored in the set of phase objects and the entity input data, applying a predictive algorithm that has been trained on recurring state process progression data of one or more represented entities to the structured metadata, and generating the readiness value as a function of applying the predictive algorithm to the structured metadata. In an embodiment, the predictive algorithm may be trained on recurring state process progression data specific to the represented entity. This may be implemented, without limitation, as referenced in FIGS. 1-5.

With continued reference to FIG. 6, method 600 may include a step 625 of refining, using a reinforcement learning model, policy parameters of the represented entity as a function of the recurring state process progression. In an embodiment, refining the policy parameters of the represented entity may include receiving response signals derived from execution of one or more phase objects of the recurring state process progression, adjusting, using the reinforcement model, the policy parameters as a function of the response signals, wherein the policy parameters include one or more of: a transition weight assigned to a link between each phase object of the set of phase objects, a threshold used to compute the readiness value, and a selection of phase objects included in the recurring state process progression. This may be implemented, without limitation, as referenced in FIGS. 1-5.

In further reference to FIG. 6, method 600 may include a step 630 of computing, using a transition evaluation model, a readiness value as a function of the entity input data and the recurring state process progression. In an embodiment, the readiness value comprises a subsequent phase indication and the transition evaluation model may be configured to compute the readiness value as a function of a transition weight associated with each link between each phase object of the set of phase objects and the entity input data. This may be implemented, without limitation, as referenced in FIGS. 1-5.

Still referring to FIG. 6, method 600 may include a step 635 of outputting, using the at least a processor, an entity-specific set of phase objects and the readiness value for use in execution of a subsequent state process progression of the represented entity. In an embodiment, the entity-specific set of phase objects and the readiness value may be stored in the state sequence database for initializing the subsequent state process progression of the represented entity. This may be implemented, without limitation, as referenced in FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
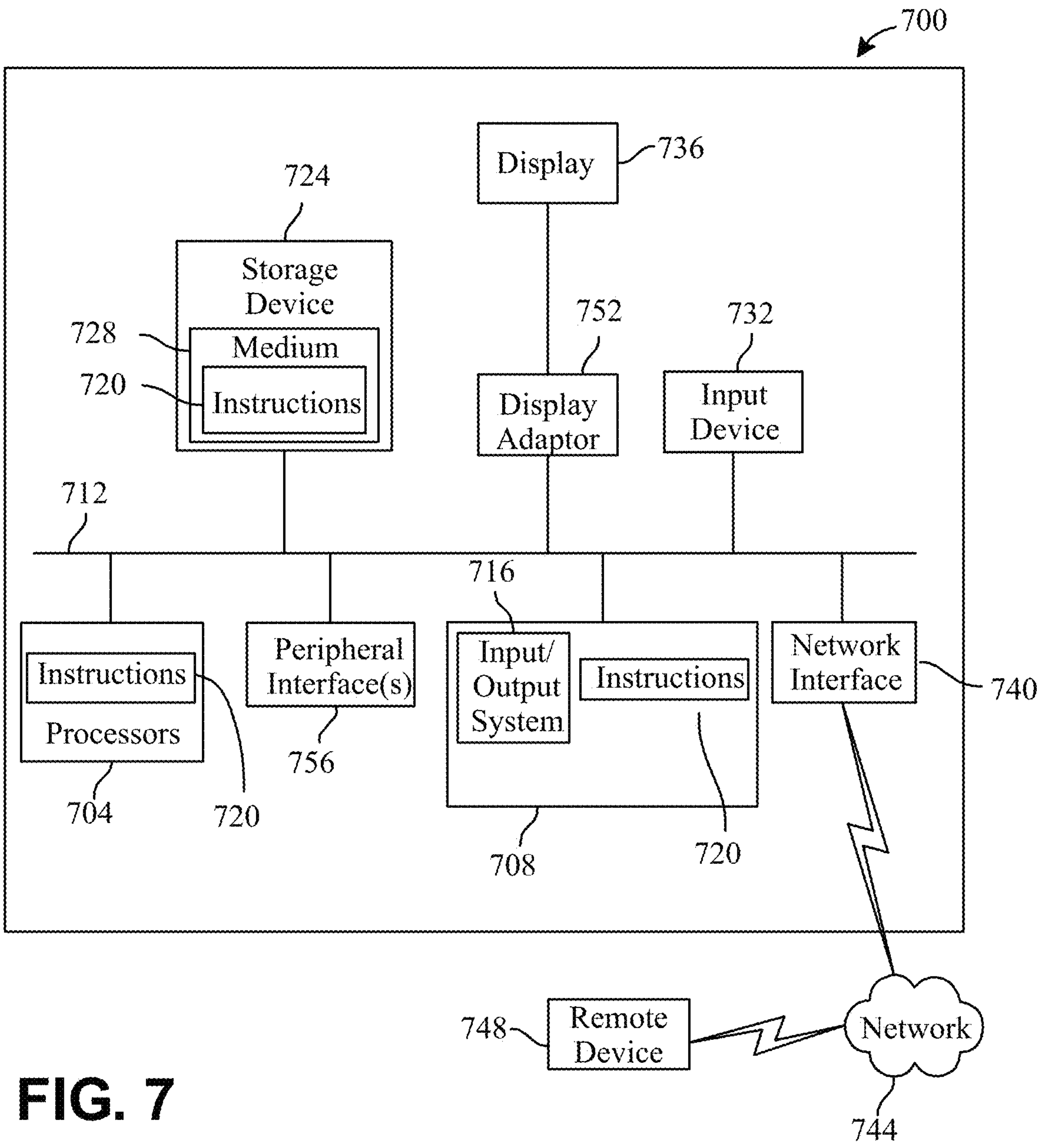
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC). Each processor and/or processor core may perform a state transition, instruction, and/or instruction step during a period of a "clock," or a regular oscillator that generates periodic output waveform, such as a square wave, having a regular period; different processors and/or cores may have distinct clocks. A processor may operate as and/or include a processing unit that performs instruction inputs, arithmetic operations, logical operations, memory retrieval operations, memory allocation operations, and/or input and output operations; a control circuit or module within a processor may determine which of the above-described functions a processor and/or unit within a processor will perform on a given clock cycle. A processor may include a plurality of processing units or "cores," each of which performs the above-described actions; multiple cores may work on disparate instruction sets and/or may work in parallel. A single core may also include multiple arithmetic, logic, or other units that can work in parallel with each other. Parallel computing between and/or within processors and/or cores may include multithreading processes and/or protocols such as without limitation Tomasulo's algorithm. As used in this disclosure, "a processor," and/or "configuring a processor," is equivalent for the purposes of this disclosure to at least a processor, a plurality of processors, and/or a plurality of processor cores, and/or programming at least a processor, a plurality of processors, and/or a plurality of processor cores, which may be configured to operate on instructions in parallel and/or sequentially according to multithreading algorithms, parallel computing, load and/or task balancing, and/or virtualization, for instance and without limitation as described below.

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof. Memory 708 may include a primary memory and a secondary memory. "Primary memory," which may be implemented, without limitation as "random access memory" (RAM), is memory used for temporarily storing data for active use by a processor. In one or more embodiments, during use of the computing device, instructions and/or information may be transmitted to primary memory wherein information may be processed. In one or more embodiments, information may only be populated within primary memory while a particular software is running. In one or more embodiments, information within primary memory is wiped and/or removed after the computing device has been turned off and/or use of a software has been terminated. In one or more embodiments, primary memory may be referred to as "Volatile memory" wherein the volatile memory only holds information while data is being used and/or processed. In one or more embodiments, volatile memory may lose information after a loss of power.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In some embodiments, storage device 724 and/or devices "Secondary memory" also known as "storage," "hard disk drive" and the like for the purposes of this disclosure is a long-term storage device in which an operating system and other information is stored; operating system and/or main program instructions may alternatively or additionally be stored in hard-coded memory ROM, or the like. In one or remote embodiments, information may be retrieved from secondary memory and copied to primary memory during use. In one or more embodiments, secondary memory may be referred to as non-volatile memory wherein information is preserved even during a loss of power. In some embodiments, data from secondary memory is transferred to primary memory before being accessed by a processor. In one or more embodiments, data is transferred from secondary to primary memory wherein circuitry may access the information from primary memory. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display 736. Examples of a display device include, but are not limited to, a liquid crystal display (LCD), a cathode ray tube (CRT), a plasma display, a light emitting diode (LED) display, and any combinations thereof. Display adapter 752 and display 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Further referring to FIG. 7, a computing device may include any computing device as described in this disclosure, including without limitation a microcontroller, microprocessor, digital signal processor (DSP) and/or system on a chip (SoC) as described in this disclosure. A computing device may include, be included in, and/or communicate with a mobile device such as a mobile telephone or smartphone. A computing device may include a single device having components as described above operating independently, or may include two or more such devices and/or components thereof operating in concert, in parallel, sequentially or the like; two or more devices, processors, memory elements, and the like may be included together in a single computing device or in two or more computing devices. A computing device may interface or communicate with one or more additional devices as described below in further detail via a network interface device.

In some embodiments, and still referring to FIG. 7, a computing device may be a component of a combination of at least a computing device; at least a computing device may include, as a non-limiting example, a first computing device or cluster of computing devices in a first location and a second computing device or cluster of computing devices in a second location. At least a computing device may include one or more computing devices dedicated to data storage, security, distribution of traffic for load balancing, and the like. At least a computing device may distribute one or more computing tasks as described below across a plurality of computing devices of computing device, which may operate in parallel, in series, redundantly, or in any other manner used for distribution of tasks or memory between computing devices. At least a computing device may be implemented, as a non-limiting example, using a "shared nothing" architecture.

With continued reference to FIG. 7, one or more programs or software instructions may include a principal program and/or operating system; principal program and/or operating system may be a program that runs automatically upon startup of a computing device and manages computer hardware and software resources. Principal program and/or operating system may include "startup," "loop," and/or "main" programs on a microcontroller; such programs may initialize hardware resources and subsequently iterate through a series of instructions to make function calls, read in data at input ports, output data at output ports, and process interrupts caused by asynchronous data inputs or the like. Principal program and/or operating system may include, without limitation, an operating system, which may schedule program tasks to be implemented by one or more processors, act as an intermediary between one or more programs and inputs, outputs, hardware and/or memory. Examples of operating systems include without limitation Unix, Linux, Microsoft Windows, Android, Disc Operating System (DOS) and the like. Operating systems may include, without limitation, multi-computer operating systems that run across multiple computing devices, real-time operating systems, and hypervisors. A "hypervisor," as used in this disclosure, is an operating system that runs a virtual machine and/or container, where virtual machines and/or containers create virtual interfaces for programs that mimic the behavior of hardware elements such as processors and/or memory; interactions with such virtual interfaces appear, to programs executed on virtual machines, to function as interactions with physical hardware, while in reality the hypervisor and/or programs such as containers (1) receive inputs from programs to the virtual resources and allocate such inputs to physical hardware that is not directly accessible to the programs, and (2) receive outputs from physical hardware and transmit such outputs to the programs in the form of apparent outputs from the virtual hardware. In some cases, one or more of computing system 700, processor 704, and memory 708 may be virtualized; that is, a virtual machine and/or container may interact directly with such computing system 700, processor 704, and/or memory 708, while managing communications therefrom and thereto via a virtual interface with programs. Computer virtualization may include dividing, or augmenting computing resources into a virtual machine, operating system, processor, and/or container. Virtualization of computer resources may be implemented through use of (1) multiple components, or portions thereof, working in concert, as if they were one unified (virtual) component; and/or (2) a portion of one or more components working as though it were a complete (virtual) component. For instance, where processor 704 comprises a plurality of processors and/or processor cores, virtualization may, in some cases, simulate or emulate a single (virtual) processor whose functions are allocated to one or more of the plurality of processors and/or processor cores. In this case, while processor 704 may be said to be virtualized, the processor 704, nevertheless, comprises actual hardware processor(s) or portion(s) thereof. Accordingly, in this disclosure, where a processor is said to perform instructions, such processor may comprise a virtualized processor, comprising a plurality or portion of hardware processors. Likewise, in this disclosure, where a memory is said to contain (i.e., store) instructions, such memory may comprise a virtualized memory, comprising a plurality or portion of memories. Technologies that enable such virtualization include (1) QEMU, www.qemu.org; (2) VMware by Broadcom Inc of Palo Alto, California; (3) VirtualBox by Oracle Corporation headquartered in Austin, Texas; and (4) kernel-based virtual machine (KVM) www.linux-kvm.org.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for adaptive coordination of recurring state process progressions for a represented entity, the system comprising:

at least a processor; and a memory communicatively connected to the at least a processor, wherein the memory contains instructions configuring the at least a processor to:

receive entity input data associated with a represented entity;

generate a set of phase objects, wherein the set of phase objects represent a recurring sequence of process phases associated with the represented entity;

assign the entity input data to one or more fields of the set of phase objects as a function of one or more attributes of the entity input data;

record the set of phase objects in a state sequence database, wherein storing the set of phase objects in the state sequence database comprises:

storing each phase object of the set of phase objects as a function of a phase identifier; and chaining the phase objects in sequence to define a recurring state process progression, wherein chaining the phase objects comprises encoding a cyclical link from a terminal phase object to an initial phase object, wherein the at least a processor is further configured to generate an alert when the cyclical link connects an implementation-phase object to a diagnosis-phase object across a configurable number of successive cycles without passing through an execution-phase object, and wherein the at least a processor is further configured to generate an alert as a function of a determination that a recurring cyclical-link pattern exceeds a configurable threshold number of successive cycles;

refine, using a reinforcement learning model, policy parameters of the represented entity as a function of the recurring state process progression;

compute, using a transition evaluation model, a readiness value as a function of the entity input data and the recurring state process progression; and output an entity-specific set of phase objects and the readiness value for use in execution of a subsequent state process progression of the represented entity.

2. The system of claim 1, wherein the entity input data is generated as a function of an interaction between the represented entity and a process framework.

3. The system of claim 1, wherein generating the set of phase objects comprises:

accessing a predefined rule set, wherein the predefined rule set parameterizes a plurality of process phases;

instantiating, for each process phase of the plurality of process phases, a data structure corresponding to each process phase; and defining one or more fields within the data structure to receive values derived from the entity input data.

4. The system of claim 1, wherein chaining the phase objects in sequence comprises:

defining a directional link from each phase object to a subsequent phase object; and modifying at least one directional link across recurring state process progressions as a function of refining the policy parameters of the represented entity.

5. The system of claim 1, wherein each link between each phase object of the set of phase objects comprises a transition weight comprising a likelihood of progression from one process phase to a subsequent process phase.

6. The system of claim 1, wherein:

the readiness value comprises a subsequent phase indication; and the transition evaluation model is configured to compute the readiness value as a function of a transition weight associated with each link between each phase object of the set of phase objects and the entity input data.

7. The system of claim 1, wherein refining the policy parameters of the represented entity comprises:

receiving response signals derived from execution of one or more phase objects of the recurring state process progression; and adjusting, using the reinforcement learning model, the policy parameters as a function of the response signals, wherein the policy parameters comprise one or more of:

a transition weight assigned to a link between each phase object of the set of phase objects;

a threshold used to compute the readiness value; and a selection of phase objects included in the recurring state process progression.

8. The system of claim 1, wherein computing the readiness value comprises:

accessing structured metadata stored in the set of phase objects and the entity input data;

applying a predictive algorithm that has been trained on recurring state process progression data of one or more represented entities to the structured metadata; and generating the readiness value as a function of applying the predictive algorithm to the structured metadata.

9. The system of claim 8, wherein the predictive algorithm is trained on recurring state process progression data specific to the represented entity.

10. The system of claim 1, wherein the entity-specific set of phase objects and the readiness value are stored in the state sequence database for initializing the subsequent state process progression of the represented entity.

11. A method for adaptive coordination of recurring state process progressions for a represented entity, the method comprising:

receiving, by at least a processor, entity input data associated with a represented entity;

generating, using the at least a processor, a set of phase objects, wherein the set of phase objects represent a recurring sequence of process phases associated with the represented entity;

assigning, using the at least a processor, the entity input data to one or more fields of the set of phase objects as a function of one or more attributes of the entity input data;

recording, using the at least a processor, the set of phase objects in a state sequence database, wherein storing the set of phase objects in the state sequence database comprises:

storing each phase object of the set of phase objects as a function of a phase identifier; and chaining the phase objects in sequence to define a recurring state process progression, wherein chaining the phase objects comprises encoding a cyclical link from a terminal phase object to an initial phase object, and wherein the at least a processor is further configured to generate an alert when the cyclical link connects an implementation-phase object to a diagnosis-phase object across a configurable number of successive cycles without passing through an execution-phase object, wherein the at least a processor is further configured to generate an alert as a function of a determination that a recurring cyclical-link pattern exceeds a configurable threshold number of successive cycles;

refining, using a reinforcement learning model, policy parameters of the represented entity as a function of the recurring state process progression;

computing, using a transition evaluation model, a readiness value as a function of the entity input data and the recurring state process progression; and outputting, using the at least a processor, an entity-specific set of phase objects and the readiness value for use in execution of a subsequent state process progression of the represented entity.

12. The method of claim 11, wherein the entity input data is generated as a function of an interaction between the represented entity and a process framework.

13. The method of claim 11, wherein generating the set of phase objects comprises:

accessing a predefined rule set, wherein the predefined rule set parameterizes a plurality of process phases;

instantiating, for each process phase of the plurality of process phases, a data structure corresponding to each process phase; and defining one or more fields within the data structure to receive values derived from the entity input data.

14. The method of claim 11, wherein chaining the phase objects in sequence comprises:

defining a directional link from each phase object to a subsequent phase object; and modifying at least one directional link across recurring state process progressions as a function of refining the policy parameters of the represented entity.

15. The method of claim 11, wherein each link between each phase object of the set of phase objects comprises a transition weight comprising a likelihood of progression from one process phase to a subsequent process phase.

16. The method of claim 11, wherein:

the readiness value comprises a subsequent phase indication; and the transition evaluation model is configured to compute the readiness value as a function of a transition weight associated with each link between each phase object of the set of phase objects and the entity input data.

17. The method of claim 11, wherein refining the policy parameters of the represented entity comprises:

receiving response signals derived from execution of one or more phase objects of the recurring state process progression; and adjusting, using the reinforcement learning model, the policy parameters as a function of the response signals, wherein the policy parameters comprise one or more of:

a transition weight assigned to a link between each phase object of the set of phase objects;

a threshold used to compute the readiness value; and a selection of phase objects included in the recurring state process progression.

18. The method of claim 11, wherein computing the readiness value comprises:

accessing structured metadata stored in the set of phase objects and the entity input data;

applying a predictive algorithm that has been trained on recurring state process progression data of one or more represented entities to the structured metadata; and generating the readiness value as a function of applying the predictive algorithm to the structured metadata.

19. The method of claim 18, wherein the predictive algorithm is trained on recurring state process progression data specific to the represented entity.

20. The method of claim 11, wherein the entity-specific set of phase objects and the readiness value are stored in the state sequence database for initializing the subsequent state process progression of the represented entity.

* * * * *